(12) United States Patent
Khalaj Amineh et al.

(10) Patent No.: US 11,143,780 B2
(45) Date of Patent: Oct. 12, 2021

(54) DETECTING AND EVALUATING ECCENTRICITY EFFECT IN MULTIPLE PIPES

(71) Applicant: Halliburton Energy Services, Inc., Houston, TX (US)

(72) Inventors: Reza Khalaj Amineh, Houston, TX (US); Burkay Donderici, Pittsford, NY (US); Luis Emilio San Martin, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 648 days.

(21) Appl. No.: 16/065,962

(22) PCT Filed: Mar. 1, 2016

(86) PCT No.: PCT/US2016/020233
§ 371 (c)(1),
(2) Date: Jun. 25, 2018

(87) PCT Pub. No.: WO2017/151117
PCT Pub. Date: Sep. 8, 2017

(65) Prior Publication Data
US 2020/0271819 A1    Aug. 27, 2020

(51) Int. Cl.
*G01B 7/312*    (2006.01)
*G01V 3/30*    (2006.01)
*E21B 47/01*    (2012.01)

(52) U.S. Cl.
CPC ............ *G01V 3/30* (2013.01); *E21B 47/01* (2013.01); *G01B 7/312* (2013.01)

(58) Field of Classification Search
CPC . G01V 3/30; G01V 3/28; G01B 7/312; E21B 47/01; E21B 47/00
USPC ............................................. 33/543
See application file for complete search history.

(56) References Cited

U.S. PATENT DOCUMENTS 9,341,053 B2 *  5/2016  Donderici .............. G01V 11/00
9,605,938 B2 *  3/2017  Helmore .................. G01B 3/24
9,650,888 B2 *  5/2017  Sethi ....................... E21B 47/13
9,823,380 B2 * 11/2017  Donderici ............... E21B 47/00
(Continued)

FOREIGN PATENT DOCUMENTS

WO    2015050834 A1    4/2015

OTHER PUBLICATIONS

Arbuzov, et al., "Memory Magnetic Imaging Defectoscopy", Society of Petroleum Engineers, 2012, 10 pages.
(Continued)

*Primary Examiner* — Yaritza Guadalupe-McCall
(74) *Attorney, Agent, or Firm* — Gilliam IP PLLC

(57) ABSTRACT

Apparatus and methods can be conducted in a multi-pipe structure to determine eccentricity of one or more pipes of the multi-pipe structure. A tool having a center axis as a symmetry axis of the tool can be used in which receivers are arranged as a number of pairs of receivers around the center axis of the tool. Each receiver of a pair can be disposed opposite the other receiver of the pair with respect to the center axis such that each pair is symmetrical with respect to the center axis of the tool. Eccentricity of one or more pipes of the multi-pipe structure can be determined based on the received responses at the receivers of the pairs.

20 Claims, 10 Drawing Sheets

(56) References Cited

U.S. PATENT DOCUMENTS

| | | | |
|---|---|---|---|
| 9,933,543 B2* | 4/2018 | Sethi | G01V 3/38 |
| 10,067,258 B2* | 9/2018 | Hill | E21B 47/00 |
| 10,190,404 B2* | 1/2019 | Khalaj Amineh | E21B 47/002 |
| 10,641,917 B2* | 5/2020 | Donderici | E21B 47/092 |
| 10,895,147 B2* | 1/2021 | Ren | G01B 7/10 |
| 10,901,111 B2* | 1/2021 | Donderici | G01V 3/30 |
| 2005/0259512 A1 | 11/2005 | Mandal | |
| 2009/0195244 A1 | 8/2009 | Mouget et al. | |
| 2010/0154531 A1 | 6/2010 | Han et al. | |
| 2015/0285057 A1* | 10/2015 | Donderici | G01V 11/005 |
| | | | 73/152.54 |
| 2015/0285607 A1* | 10/2015 | Helmore | G01B 5/12 |
| | | | 33/558.2 |
| 2015/0378046 A1* | 12/2015 | Donderici | E21B 47/002 |
| | | | 324/339 |
| 2016/0032710 A1* | 2/2016 | Hu | E21B 47/08 |
| | | | 33/544.2 |
| 2016/0090835 A1* | 3/2016 | Sethi | G01V 3/18 |
| | | | 324/338 |
| 2016/0154134 A1* | 6/2016 | Donderici | G01V 3/26 |
| | | | 324/339 |
| 2016/0195635 A1* | 7/2016 | Sethi | E21B 47/002 |
| | | | 324/338 |
| 2016/0202381 A1* | 7/2016 | Hill | G01V 3/18 |
| | | | 324/338 |
| 2017/0191361 A1* | 7/2017 | Khalaj Amineh | G01V 3/30 |
| 2019/0369285 A1* | 12/2019 | Fouda | E21B 47/00 |
| 2020/0190969 A1* | 6/2020 | Ren | E21B 47/08 |
| 2020/0271818 A1* | 8/2020 | Fouda | G01V 3/28 |
| 2020/0271819 A1* | 8/2020 | Khalaj Amineh | E21B 47/00 |
| 2020/0309986 A1* | 10/2020 | Donderici | G01V 3/38 |
| 2020/0400008 A1* | 12/2020 | Dutta | E21B 47/005 |

OTHER PUBLICATIONS

Garcia, et al., "Successful Application of a New Electromagneitc Corrosion Tool for Well Integrity Evaluation in Old Wells Completed with Reduced Diameter Tubular", International Petroleum Conference, 2013, 12 pages.

PCT Application Serial No. PCT/US2016/020233, International Search Report, dated Nov. 29, 2016, 3 pages.

PCT Application Serial No. PCT/US2016/020233, International Written Opinion, dated Nov. 29, 2016, 15 pages.

* cited by examiner

DETECTING AND EVALUATING ECCENTRICITY EFFECT IN MULTIPLE PIPES

TECHNICAL FIELD

The present invention relates generally to apparatus and methods with respect to measurements related to oil and gas exploration.

BACKGROUND

Monitoring the condition of the production and intermediate casing strings, tubing, collars, filters, packers, and perforations is crucial in oil and gas field operations. Electromagnetic (EM) techniques are common in inspection of these components. EM sensing can provide continuous, in situ measurements of the integrity of tubing/casing. As a result, there has been considerable interest in using EM in cased borehole monitoring applications. One major EM technique operates based on producing and sensing eddy current (EC) in these metallic components. In EC technique, a transmitting coil emits primary field into the pipes. These fields produce eddy currents in the pipes. These currents, in turn, produce secondary fields. Characterization of the pipes is performed by measuring and processing these secondary fields. In current developed inversion algorithms to characterize the pipes based on the measured responses, it is assumed that the pipes are concentric. However, in practice, the pipes may have eccentricity with respect to the tool.

DETAILED DESCRIPTION

The following detailed description refers to the accompanying drawings that show, by way of illustration and not limitation, various embodiments in which the invention may be practiced. These embodiments are described in sufficient detail to enable those skilled in the art to practice these and other embodiments. Other embodiments may be utilized, and structural, logical, mechanical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

One corrosion inspection tool, for example, uses remote field eddy current approximations to provide estimates of the total thickness of the casings, employing multiple frequency-domain data acquisitions and interpretations and using an inversion process. Azimuthal resolution is achieved via the use of multiple receivers distributed along the azimuthal direction. Other corrosion inspection tools analyze the time-domain decay response to characterize the tubing plus casing with azimuthally symmetrical transmitters and receivers. None of these tools perform measurements specifically for reducing the eccentricity effects. Their inversion algorithms have been instead developed based on the assumption that the tool and the pipes is concentric or eccentricity compensation algorithms are employed based on the pure signal processing approaches.

In various embodiments, a tool can be implemented to detect and evaluate the amount of eccentricity in multiple pipe inspection scenarios. Such a tool and methods of operating the tool can provide a number of advantages such as: (i) detecting which pipe or pipes in a multi-pipe structure has eccentricity with respect to the center axis of transmitter and receiver coils of the tool, (ii) evaluating the amount of eccentricity of the pipes with respect to the center axis of the transmitter and receiver coils of the tool, (iii) employing the detection and evaluation of the eccentricity for particular pipes in a properly devised correction algorithm for an inversion process, and (iv) providing characterization of the multiple tubular components with better accuracy that provides a more precise evaluation of these components and ultimately leads to a significant positive impact on the production process.

Figure 1:
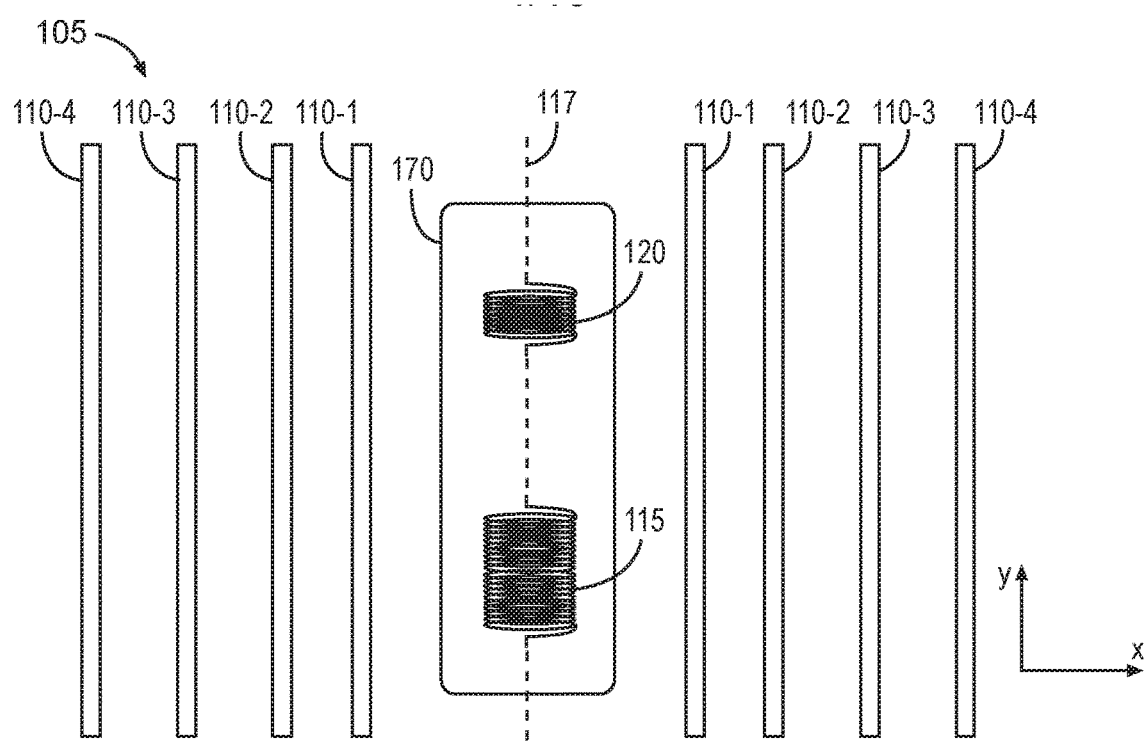
FIG. 1 is an illustration of a concentric pipe structure, in accordance with various embodiments.

FIG. 1 is an illustration of a concentric pipe structure 105. The concentric pipe structure 105, which is a multi-pipe structure, may include pipes 110-1, 110-2, 110-3, and 110-4. The concentric pipe structure 105 may be located in a borehole at a well site. Though, FIG. 1 shows four pipes, the concentric pipe structure 105 may include more or less than four pipes. A transmitter 115 and a receiver 120 of a measurement tool 170 can be operated to inspect the pipes of the concentric pipe structure 105 to characterize and/or evaluate the concentric pipe structure 105 and its individual pipes. The transmitter 115 and the receiver 120 can be arranged on a symmetric axis 117 of the measurement tool 170. With no eccentricity in pipes 110-1, 110-2, 110-3, and 110-4, the symmetric axis 117 can coincide with the axis of the concentric pipe structure 105, where the axes of each of pipes 110-1, 110-2, 110-3, and 110-4 is also the axis of the concentric pipe structure 105. The measurement tool 170 can be moved along an axis that coincides with the symmetry axis of the measurement tool 170. The symmetry axis 117 of the measurement tool 170 with respect to the receiver 120 and the transmitter 115 can be taken as a reference axis to evaluate concentric pipe structure 105. The transmitter 115 and the receiver 120 can be moved along the longitudinal axis 117 of innermost pipe 110-1 to make measurements at different depths. Wireline arrangements, or other conventional conveyance techniques, can be used to dispose the transmitter 115 and the receiver 120 in the concentric pipe structure 105 below the earth's surface at a well site. Movement along the longitudinal axis 117 may be conducted within the concentric pipe structure 105 parallel to longitudinal axis 117. Alternatively, the transmitter 115 and the receiver 120 may be realized as a number of transmitters and receivers within the concentric pipe structure 105 disposed along an axis coinciding with the symmetric axis of the measurement tool 170 at different depths from the earth's surface.

Figure 2:
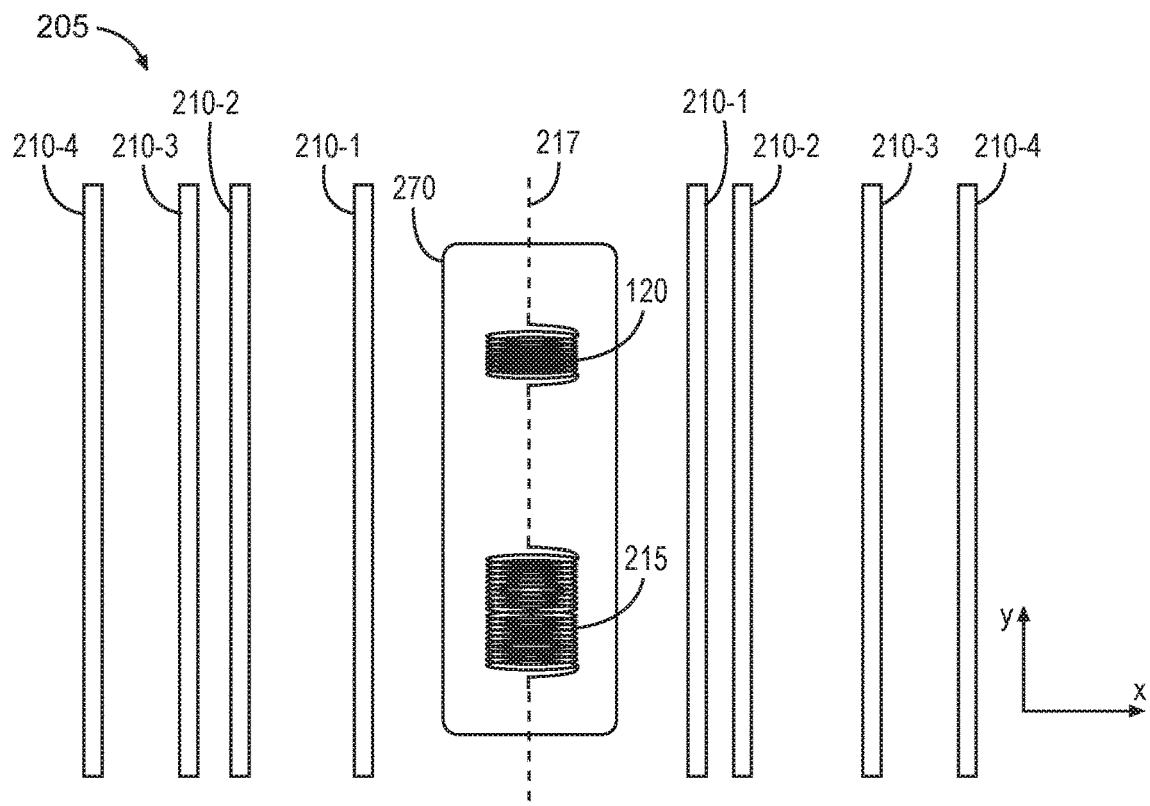
FIG. 2 is an illustration of an eccentric pipe structure, in accordance with various embodiments.

FIG. 2 is an illustration of an eccentric pipe structure 205. The eccentric pipe structure 205, which is a multi-pipe structure, may include pipes 210-1, 210-2, 210-3, and 210-4. The eccentric pipe structure 205 may be located in a borehole at a well site. Though, FIG. 2 shows four pipes, the eccentric pipe structure 205 may include more or less than four pipes. A transmitter 215 and a receiver 220 of a measurement tool 270 can be operated to inspect the pipes of the eccentric pipe structure 205 to characterize and/or evaluate the eccentric pipe structure 205 and its individual pipes. The transmitter 215 and the receiver 220 can be arranged on a symmetry axis 217 of the measurement tool 270. The measurement tool 270 can be moved along an axis that coincides with the symmetry axis of the measurement tool 270 and an axis of the innermost pipe 210-1. Alternatively, the measurement tool 270 can be moved along an axis that was intended to be the axis for each of pipes 210-1, 210-2, 210-3, and 210-4. The symmetry axis 217 of the measurement tool 270 with respect to the receiver 220 and the transmitter 215 can be taken as a reference axis to evaluate eccentric pipe structure 205. The transmitter 215 and the receiver 220 can be moved along the longitudinal axis 217 to make measurements at different depths. Wireline arrangements, or other conventional conveyance techniques, can be used to dispose the transmitter 215 and the receiver 220 in the eccentric pipe structure 205 below the earth's surface at a well site. Alternatively, the transmitter 215 and the receiver 220 may be realized as a number of transmitters and receivers within the eccentric pipe structure 205 disposed along an axis coinciding with the symmetry axis of the measurement tool 270 at different depths from the earth's surface.

Figure 3:
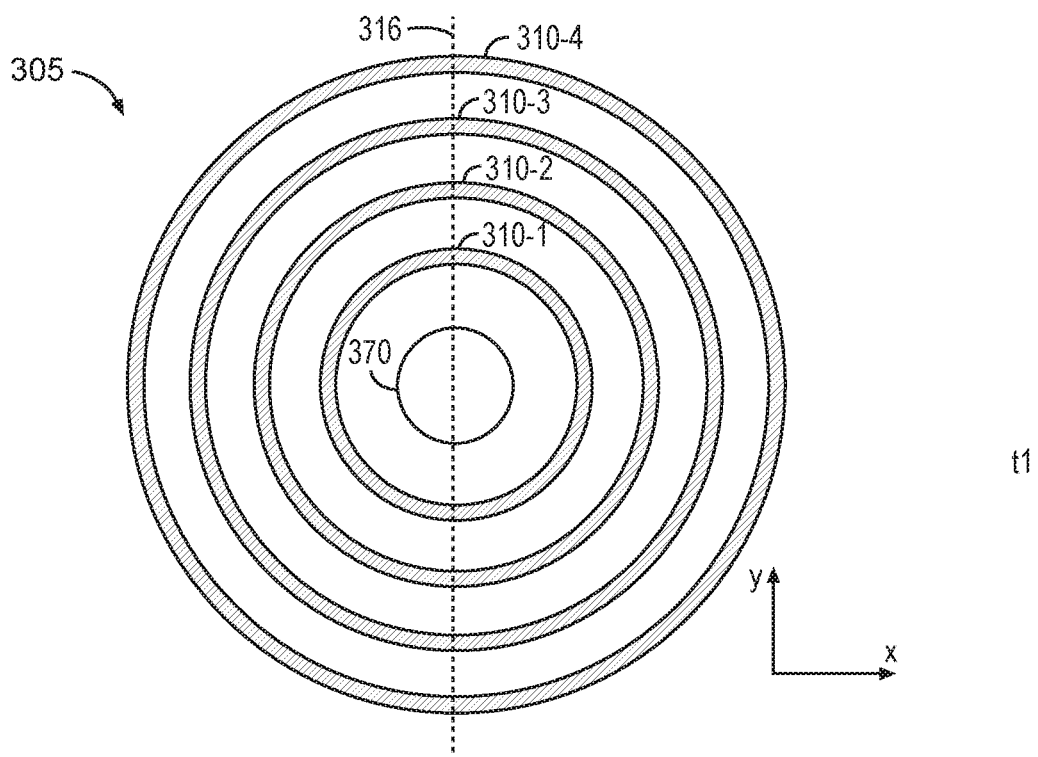
FIG. 3 is an illustration of a cross section of a concentric pipe structure, in accordance with various embodiments.

FIG. 3 is an illustration of a cross section of a concentric pipe structure 305. Pipe structure 305 may be similar to or identical to pipe structure 105 of FIG. 1. The concentric pipe structure 305, which is a multi-pipe structure, may include pipes 310-1, 310-2, 310-3, and 310-4, which are symmetric with respect to a symmetry axis 316 of a tool 370. The concentric pipe structure 305 may be located in a borehole at a well site. Though, FIG. 3 shows four pipes, the concentric pipe structure 305 may include more or less than four pipes.

Figure 4:
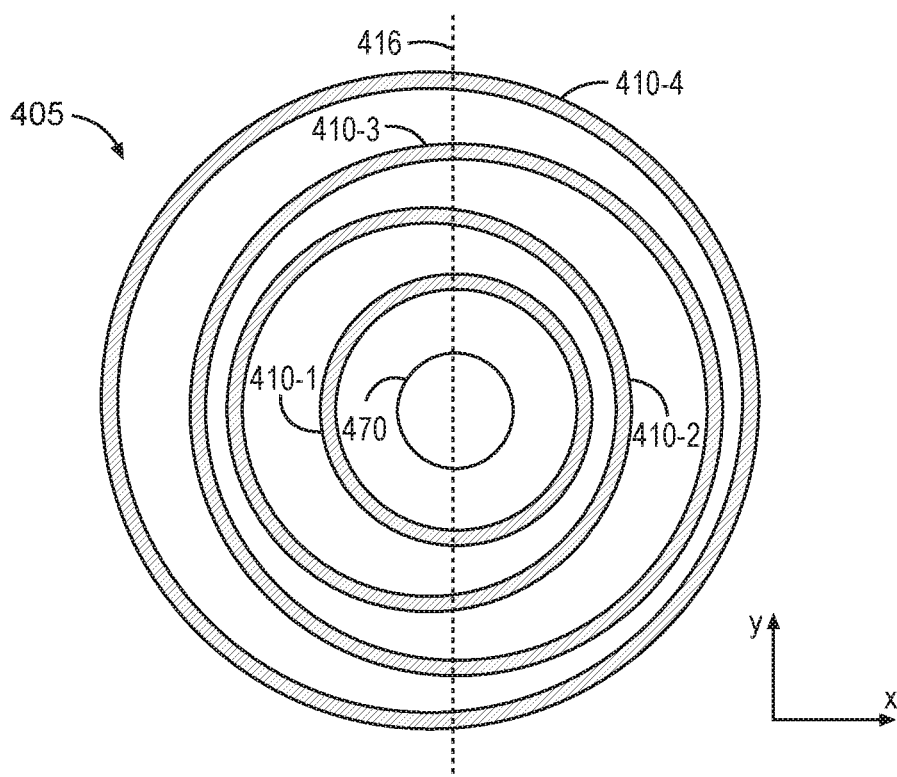
FIG. 4 is an illustration of a cross section of an eccentric pipe structure, in accordance with various embodiments.

FIG. 4 is an illustration of a cross section of an eccentric pipe structure 405. Pipe structure 405 may be similar to or identical to pipe structure 205 of FIG. 2. The eccentric pipe structure 405, which is a multi-pipe structure, may include pipes 410-1, 410-2, 410-3, and 410-4 in which pipes 410-1, 410-3, and 410-4 are symmetric with respect to a symmetry axis 416 of a tool 470. Pipe 410-2 has eccentricity with respect to the symmetry axis 416 of the tool 470. The eccentric pipe structure 405 may be located in a borehole at a well site. Though, FIG. 4 shows four pipes, the concentric pipe structure 405 may include more or less than four pipes.

The multi-pipe structures of FIGS. 1-4 are illustrations of pipe configurations that can be found at production well sites. Such structures need to be monitored for conditions that can affect efficiency of production. For example, these structures can be inspected with respect to corrosion and other defects.

In current corrosion inspection tools, inversion algorithms are typically developed based on the assumption that the pipes and the tool are perfectly concentric, as shown in FIG. 1 and FIG. 3. However, in practice, one or more pipes may have eccentricity with respect to the measurement tool. This factor affects the accuracy of the inversion results and reduces the capability of the tool in precise characterization of the pipes. Thus, to lower the characterization errors, it is crucial to develop approaches that are capable of detecting and evaluating the eccentricity of the pipes with respect to the tool. Knowing the amount of eccentricity can then be employed to alleviate the errors on the inversion results imposed by such an effect.

In various embodiments as taught herein, a technique can be implemented to detect and evaluate the amount of eccentricity for multiple pipes, separately. To perform such a technique, a tool is provided that includes a number of identical receivers distributed azimuthally in a way that they provide full coverage along the azimuthal direction. These receivers should be distributed on a pair-wise basis such that each respective pair of the set of receivers would be symmetrical with respect to the center of the tool. This configuration allows for evaluation of eccentricity of multiple pipes in both a time-domain technique and a frequency domain technique.

Consider eccentricity evaluation in time-domain using a pulsed eddy current (PEC) technique. In a PEC technique, excitation source transmits one or more primary electromagnetic waves that can impinge upon a conductive object such as a pipe. In response to receiving electromagnetic waves, the conductive object is excited with eddy currents generated in the conductive object. The eddy currents produce a secondary magnetic field, which can be detected by a sensor. In operating time domain tools, a transmitting coil sends pulsed signals generating electromagnetic fields that induce eddy currents in surrounding conductive objects such as pipes. Once the transmitter is turned off, one or more receiving coils may record the electromotive voltages produced by the eddy currents in the conductive objects.

Figure 5:
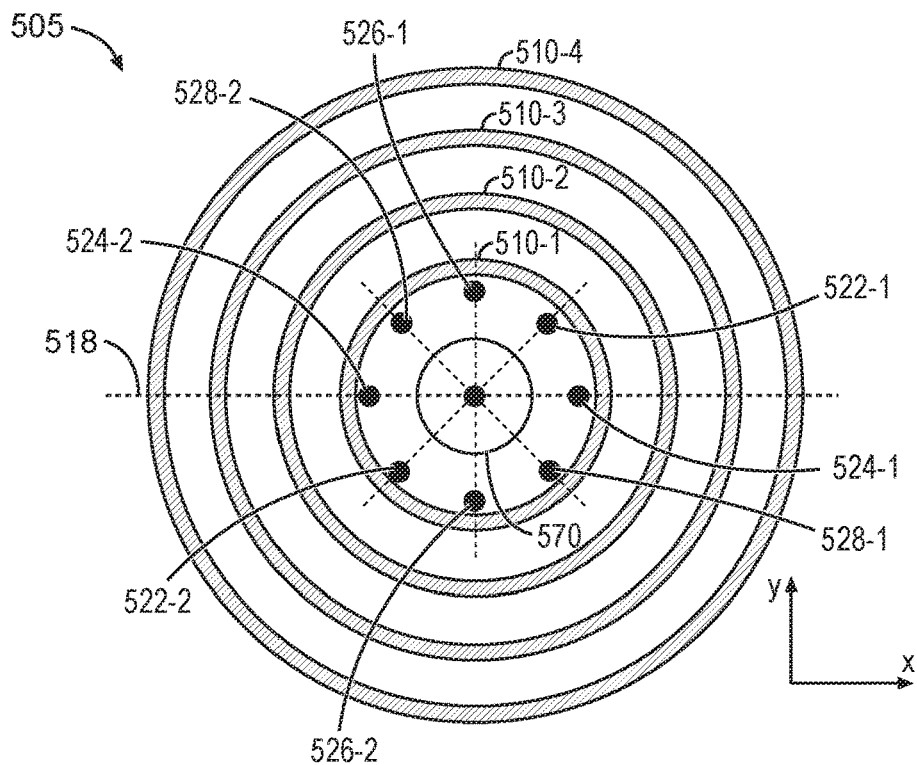
FIG. 5 is an illustration of a concentric configuration of the pipes with a tool disposed in the multi-pipe structure, in accordance with various embodiments.

FIG. 5 is an illustration of a concentric configuration of the pipes with a tool 570 disposed in the multi-pipe structure 505. The multi-pipe structure 505 in this example includes pipes 510-1, 510-2, 510-3, and 510-4. Though four pipes are shown, more or less than four pipes may be in a structure being investigated. The tool 570 has azimuthally distributed sensors 522-1, 522-2, 524-1, 524-2, 526-1, 526-2, 528-1, and 528-2 to detect and evaluate eccentricity. Though eight sensors are shown, more or less than eight sensors can be used.

The center of the tool 570 provides axis of symmetric for these sensors. The sensors 522-1, 522-2, 524-1, 524-2, 526-1, 526-2, 528-1, and 528-2 are distributed on a pair-wise basis: 522-1 with 522-2, 524-1 with 524-2, 526-1 with 526-2, and 528-1 with 528-2. As shown, each sensor of a respective pair is centered on a line between each other, where the line passes through the center of the tool 570. As shown in FIG. 5, the pairs are located in the plane, which in this case is the x-y plane that is perpendicular to the z-axis along which the length of the pipes extends. A reference axis through the center of the tool 570 can be used as an eccentricity axis for evaluating the multi-pipe structure 505. The eccentricity axis 518 is in the x-y plane in this example.

In PEC technique, if the pipes are all concentric with respect to the tool 570 as shown in FIG. 5, the responses recorded by all the identical receivers are the same. However, if one pipe has eccentricity with respect to the tool 570, the recorded decay response for the sensors varies. For example, consider FIG. 6.

Figure 6:
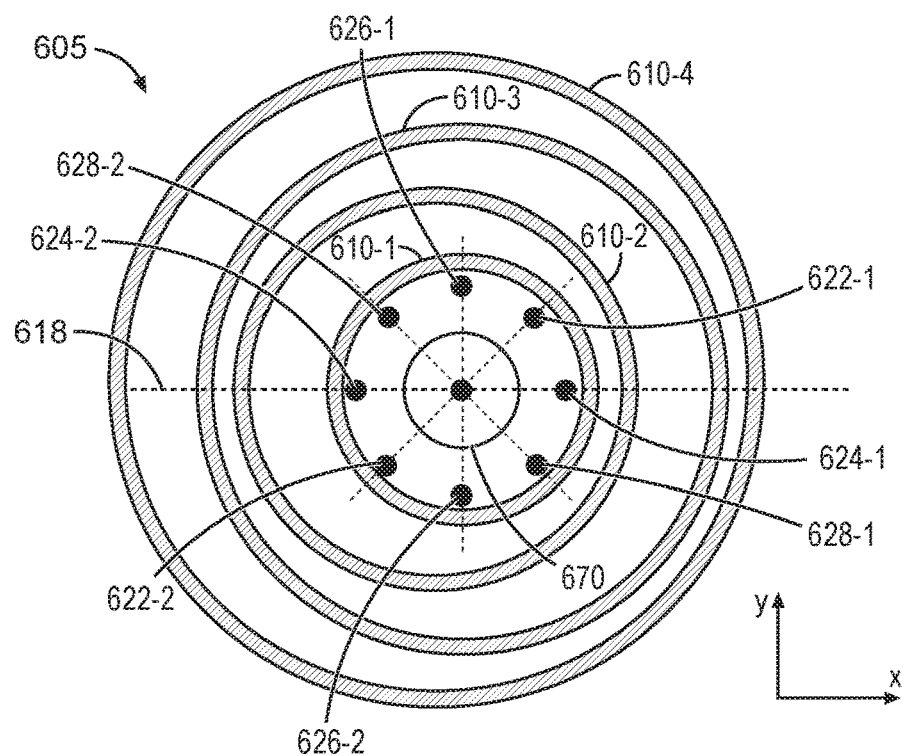
FIG. 6 is an illustration of a configuration of a multi-pipe structure in which two pipes are concentric with respect to the center of a tool and two pipes have eccentricity with respect to the center of the tool, in accordance with various embodiments.

FIG. 6 is an illustration of a configuration of a multi-pipe structure 605 in which two pipes are concentric with respect to the center of a tool 670 and two pipes have eccentricity with respect to the center of the tool 670. The multi-pipe structure 605 includes pipes 610-1, 610-2, 610-3, and 610-4, where pipe 610-1 and pipe 610-3 are concentric, but pipe 610-2 and pipe 610-4 have eccentricity with respect to the center of the tool 670. Though four pipes are shown, more or less than four pipes may be in a structure being investigated. The tool 670 has azimuthally distributed sensors 622-1, 622-2, 624-1, 624-2, 626-1, 626-2, 628-1, and 628-2 to detect and evaluate eccentricity. Though eight sensors are shown, more or less than eight sensors can be used.

The center of the tool 670 provides axis of symmetric for these sensors. The sensors 622-1, 622-2, 624-1, 624-2, 626-1, 626-2, 628-1, and 628-2 are distributed on a pair-wise basis: 622-1 with 622-2, 624-1 with 624-2, 626-1 with 626-2, and 628-1 with 628-2. As shown, each sensor of a respective pair is centered on a line between each other, where the line passes through the center of the tool 670. As shown in FIG. 6, the pairs are located in the plane, which in this case is the x-y plane that is perpendicular to the z-axis along which the length of the pipes extends. A reference axis through the center of the tool 670 can be used as an eccentricity axis 618 for evaluating the multi-pipe structure 605. The eccentricity axis 618 is in the x-y plane in this example.

Figure 7:
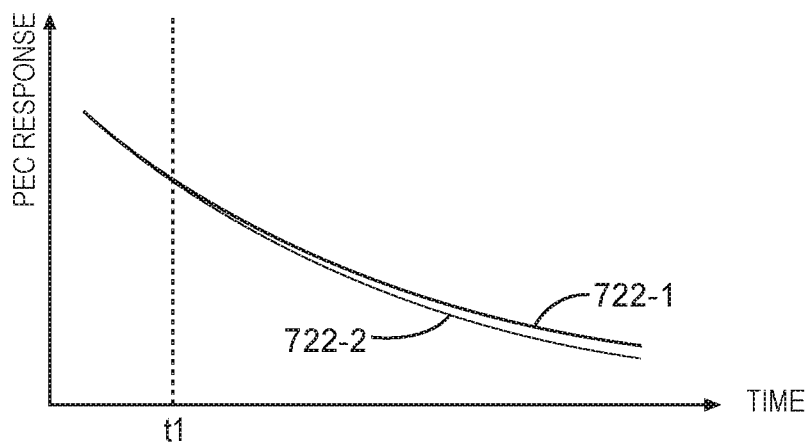
FIG. 7 is a plot of pulsed eddy current responses over time for two sensors, providing a comparison of the pulsed eddy current responses received by the sensors, when two pipes have some eccentricity with respect to the tool axis as shown in FIG. 6, in accordance with various embodiments.

If the pipe 610-2 has eccentricity, as shown in FIG. 6, the responses for most of the sensor pairs would be different. For example, the responses for the 622-1 with 622-2 sensor pair would be different as shown in the FIG. 7. FIG. 7 is a plot of PEC responses over time for sensors 622-1 and 622-2, providing a comparison of the PEC responses received by sensor 622-1 in curve 722-1 and sensor 622-2 in curve 722-2, when pipe 610-2 and pipe 610-4 have some eccentricity with respect to the tool axis as shown in FIG. 6.

Figure 8:
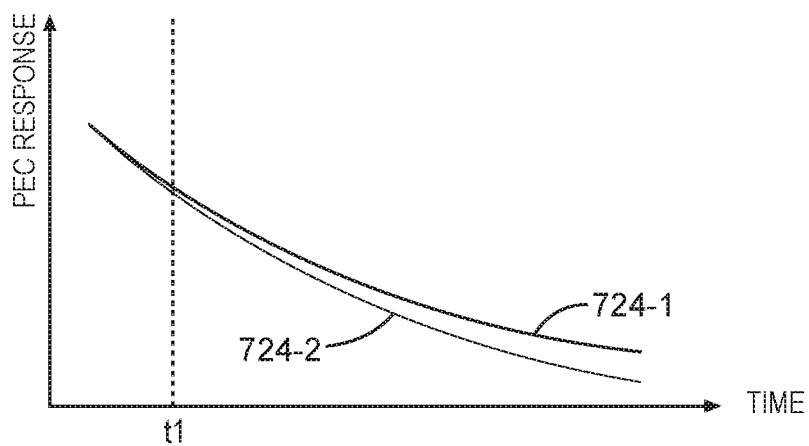
FIG. 8 is a plot of pulsed eddy current responses over time for sensors, providing a comparison of the pulsed eddy current responses received by the sensors, when two pipes have some eccentricity with respect to the tool axis as shown in FIG. 6, in accordance with various embodiments.

FIG. 8 is a plot of PEC responses over time for sensors 624-1 and 624-2, providing a comparison of the PEC responses received by sensor 624-1 in curve 724-1 and sensor 624-2 in curve 724-2, when pipe 610-2 and pipe 610-4 have some eccentricity with respect to the tool axis as shown in FIG. 6. The difference between the responses of the 624-1 with 624-2 sensor pair will be the largest after time t1, and before the effects of other pipes are received, as shown in FIG. 8, since they are along the eccentricity direction 618 for pipe 610-2. By considering the azimuthal angle of the sensor pairs and the time from which the responses start to differ, the direction of eccentricity and the extent of that eccentricity for multiple pipes can be determined. For example, if the responses start to differ from the very early times, it can be deduced that the first pipe is eccentric with respect to the tool while eccentricity of the outer pipes cause the difference in the responses of theses sensors pairs at later decay times.

Figure 9:
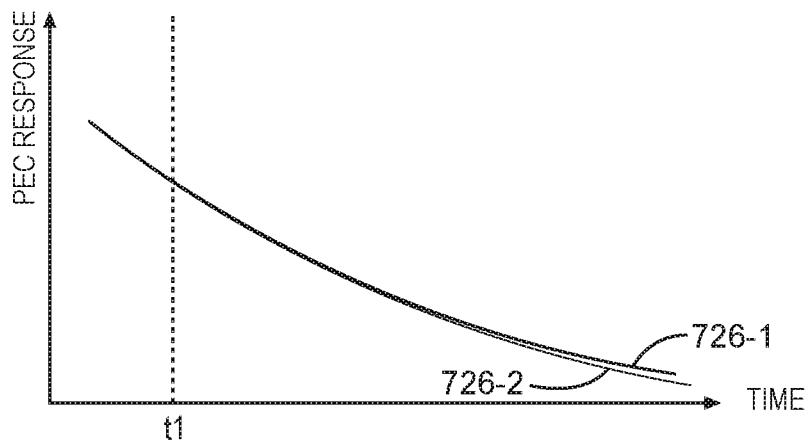
FIG. 9 is a plot of pulsed eddy current responses over time for two sensors, providing a comparison of the pulsed eddy current responses received by the sensors, when two pipes have some eccentricity with respect to the tool axis as shown in FIG. 6, in accordance with various embodiments.

FIG. 9 is a plot of PEC responses over time for sensors 626-1 and 626-2, providing a comparison of the PEC responses received by sensor 626-1 in curve 726-1 and sensor 626-2 in curve 726-2, when pipe 610-2 and pipe 610-4 have some eccentricity with respect to the tool axis as shown in FIG. 6, The difference between the responses for sensors 626-1 and 626-2 is the slightest after time t1, since they are along the line perpendicular to the eccentricity axis 618 for pipe 610-2. However, sensors 626-1 and 626-2 are employed to detect eccentricity on any outer pipe (pipe 610-4 in this example). Thus, the difference in their responses appears after time t3.

As noted, the responses of the 626-1 with 626-2 pair, which are positioned on an axis perpendicular to the eccentricity axis 618 of pipe 610-2, will not be influenced by this eccentricity of pipe 610-2, but can be employed to evaluate the eccentricity of an outer pipe, pipe 610-4 in this example. Again, according to the appearance of the difference between the responses of the 626-1 and 626-2 sensor pair, it can be decided that which pipe (pipe 610-3 or pipe 610-4) has eccentricity. However, the extent of the eccentricity may not be estimated as accurate as pipe 610-2, since now only one pair of sensors are employed to estimate the eccentricity of pipe 610-3 or pipe 610-4 (or few sensor pairs around the 626-1 and 626-2 sensor pair that their responses have not been affected drastically by the eccentricity of pipe 610-2).

Figure 10:
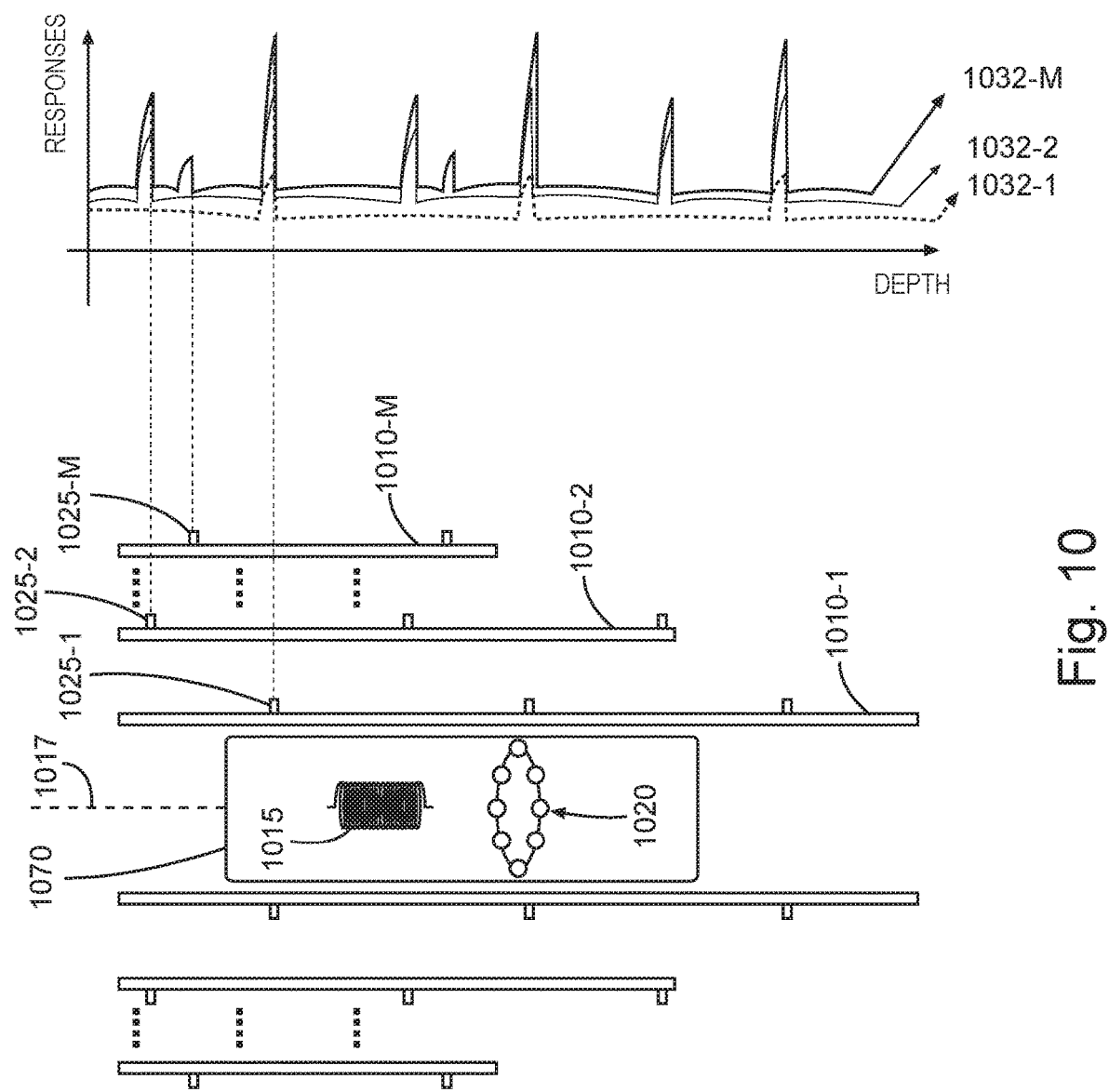
FIG. 10 is an illustration of multiple pipes with collars on pipes, in accordance with various embodiments.

In various embodiments, responses due to collars can be employed to estimate the direction and extent of eccentricity for multiple pipes. Collars are regions of the joints between the pipes. These regions have a number of properties that can be employed for estimating eccentricity of the pipes. Collars cause a sudden increase in the thickness of the pipe as shown in FIG. 10. This sudden increase in the metal produces a strong response that is much larger than the response due to the nominal sections of each pipe. Collars repeat periodically along the depth over each pipe as shown in FIG. 10. Thus, they can be employed to monitor the eccentricity of the pipes along the depth. Techniques based on the presence of collars may be used to provide a more accurate approach to estimate the direction and amount of eccentricity.

FIG. 10 is an illustration of multiple pipes 1010-1, 1010-2 . . . 1010-M with collars 1025-1, 1025-2, and 1025-M on pipes 1010-1, 1010-2 . . . 1010-M, respectively. The pipes 1010-1, 1010-2 . . . 1010-M may be casings in a wellbore. Each of pipes 1010-1, 1010-2 . . . 1010-M have a number of collars, the number depending on the particular pipe, though for ease of discussion one collar for each pipe is listed in FIG. 10. A tool 1070 can have at least one transmitter 1015 and a receiver 1020 having azimuthally distributed sensors, similar to or identical to sensor pairs associated with FIG. 6. The tool 1070 may be moved along axis 1017. FIG. 10 also illustrates the responses that are obtained at each depth at response times 1032-1 ($t^1$), 1032-2 ($t^2$), to 1032-M ($t^M$), where $t^1 < t^2 < \ldots < t^M$. The response of the collars on outer pipes start to appear in later time responses. Each individual sensor receives such responses.

In order to use the above-mentioned properties of the collars in evaluating the eccentricity of the pipes, first, the time after which the response is affected due to the collars for each pipe can be estimated from the measurements. Then, using the responses at proper times, the depth positions of collars can be detected for each pipe. This can be performed by finding the positions at which the response is affected the most as shown in FIG. 10, Each curve in FIG. 10 corresponds to a different response time, since the effect of collars on the inner most pipes are observed at the earlier response times, while the effects of collars on the outer most pipes are observed at the later response times.

Next, the responses of the azimuthally distributed sensor pairs can be compared at collar locations for each pipe. Since the responses due to the collars are strong, the effect of collars on outer pipes can be detected when comparing the decay responses of the sensor pairs even if these responses have differences due to the eccentricity of the inner pipes. By comparing the magnitude or time of the responses for the sensor pairs, the orientation and amount of eccentricity can be evaluated.

Figure 11:
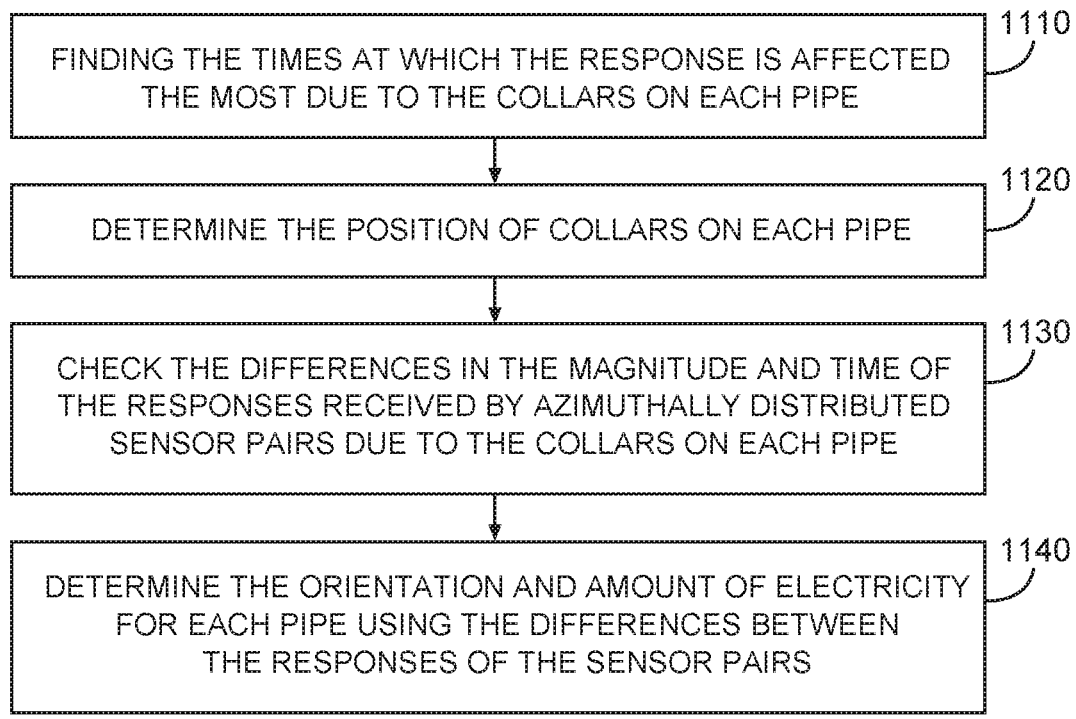
FIG. 11 is a flow diagram of procedures to estimate the orientation and extent of eccentricity from the responses received at the collar positions, in accordance with various embodiments.

FIG. 11 is a flow diagram of procedures to estimate the orientation and extent of eccentricity from the responses received at the collar positions. At 1110, the times at which the response is affected the most due to collars on each pipe are found. At 1120, the position of collars on each pipe is determined. At 1130, the differences in magnitude and time of the responses received by the azimuthally distributed sensor pairs due to the collars on each pipe are checked. At 1140, the orientation and amount of eccentricity for each pipe using the differences between the responses of the sensor pairs is determined.

Figure 12:
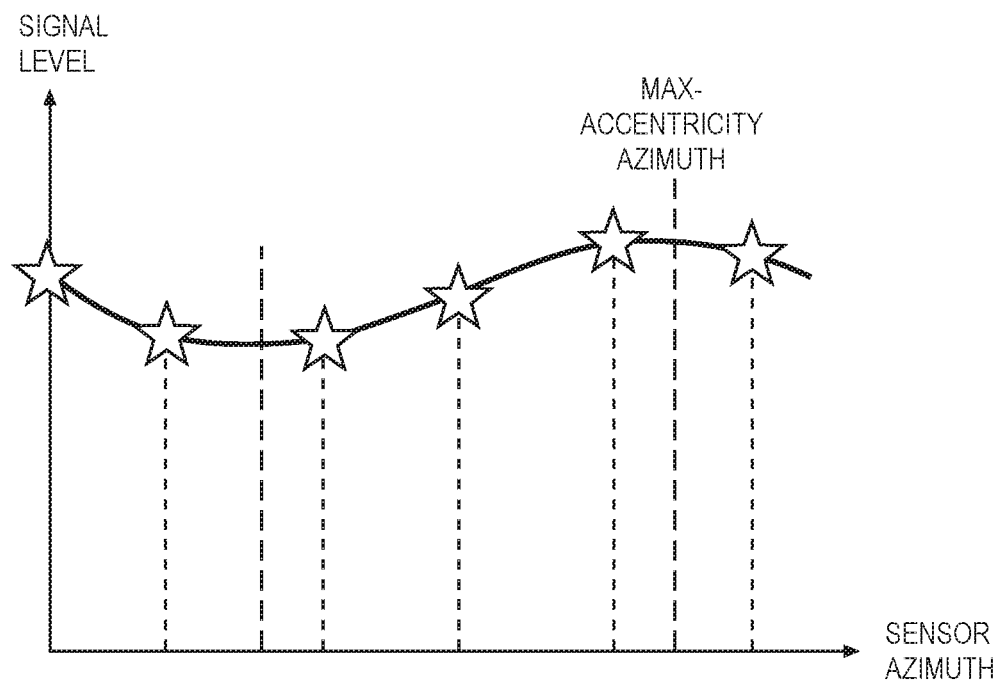
FIG. 12 is a plot of signal level versus sensor azimuth that can provide a basic eccentricity azimuth calculation from sensor data, in accordance with various embodiments.

Eccentricity's relative azimuth can be calculated from an angle that produces the minimum or maximum signal as a function of sensor azimuth. This can be accomplished by plotting the signal time response or signal frequency response as a function of sensor azimuth, interpolating the resulting function, and identifying the azimuth at which the peak is observed. This method can be most accurate for the inner pipes since eccentricity in the inner pipes may complicate the signal from the outer pipes. FIG. 12 is a plot of signal level versus sensor azimuth that can provide a basic eccentricity azimuth calculation from sensor data.

Consider eccentricity evaluation in the frequency-domain. A frequency-domain technique that may be implemented is an eddy current (EC) frequency-domain technique. Tools for frequency domain applications can transmit continuous sinusoidal waves and record induced voltages at the receivers. While time domain tools provide information across a larger frequency bandwidth, frequency domain tools may be more useful in exploiting frequency-specific characteristics of conductive objects, for example pipes, such as using lower frequencies for better penetration depth into a series of pipes in a multi-pipe structure. Thus, in various embodiments, a frequency domain eddy current technique may be employed that is applied at multiple frequencies, instead of a time domain (e.g., pulsed) technique.

In various embodiments, techniques employing azimuthally distributed sensors and processing similar to the techniques taught herein with respect to time-domain method(s) can be implemented in a frequency-domain EC technique. In such a frequency-domain technique, the responses of the outer pipes start to appear in the lower frequencies while decreasing the frequency from higher to lower values. Similar curves and discussions with respect to FIGS. 5-10 apply for the frequency-domain technique with the exception that, instead of the horizontal axis being time in ascending order, frequency will be in descending order. As an example, FIG. 10 has been adapted for frequency domain as shown in FIG. 13.

Figure 13:
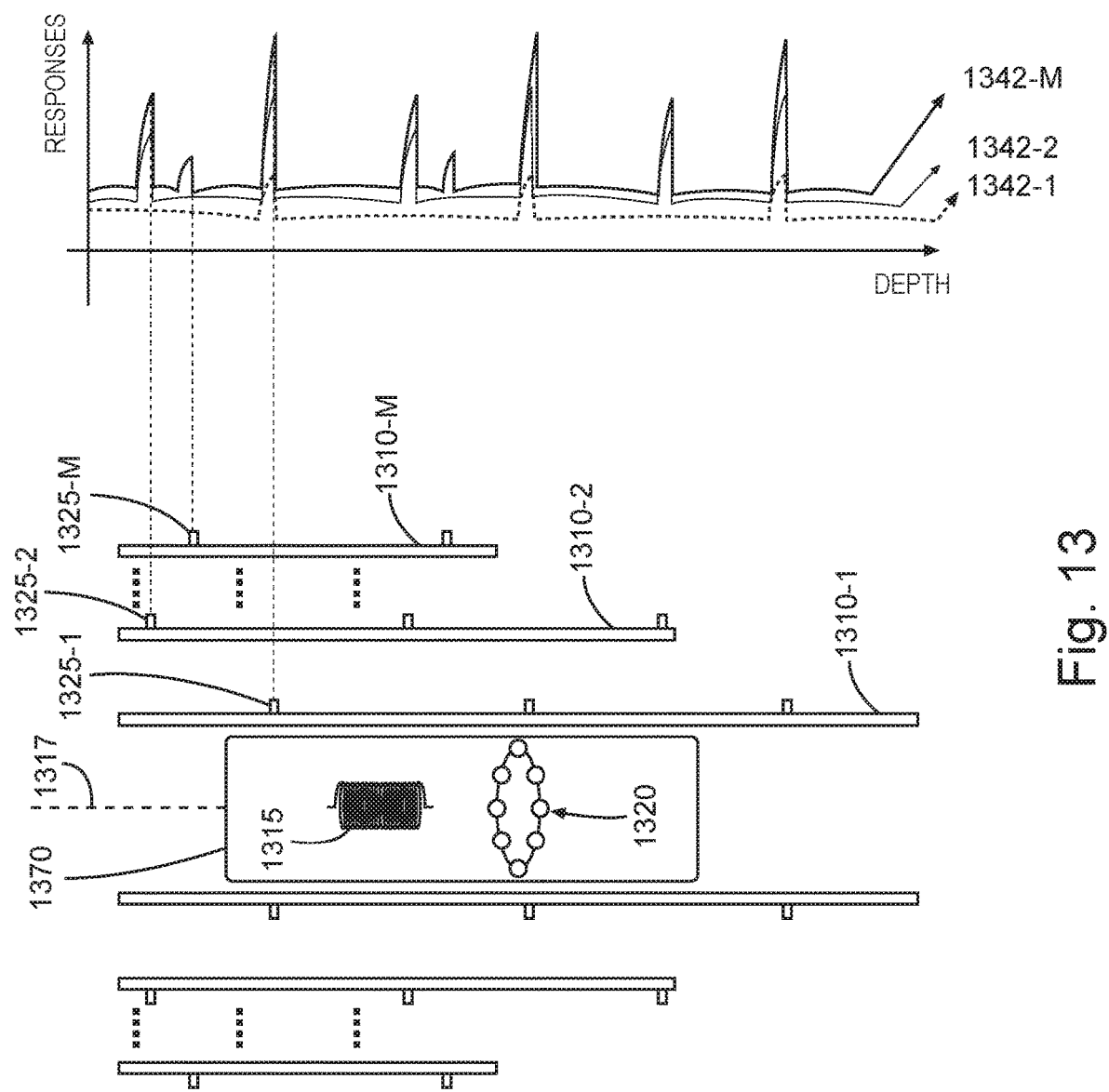
FIG. 13 is an illustration of multiple pipes with collars on the pipes, in accordance with various embodiments.

FIG. 13 is an illustration of multiple pipes with collars on the pipes. FIG. 13 shows multiple pipes 1310-1, 1310-2 . . . 1310-M with collars 1325-1, 1325-2, and 1325-M on pipes 1310-1, 1310-2 . . . 1310-M, respectively. The pipes 1310-1, 1310-2 . . . 1310-M may be casings in a wellbore. Each of pipes 1310-1, 1310-2 . . . 1310-M have a number of collars, the number depending on the particular pipe, though for ease of discussion one collar for each pipe is listed in FIG. 13. A tool 1370 can have at least one transmitter 1315 and a receiver 1320 having azimuthally distributed sensors, similar to sensor pairs associated FIGS. 6 and 10, The tool 1370 may be moved along axis 1317. This figure also illustrates the responses that are obtained at each depth at frequencies 1342-1 ($f^1$), 1342-2 ($f^2$), to 1342-M ($f^M$), where $f^1 > f^2 > \ldots f^M$. The response of the collars on outer pipes start to appear in lower frequencies, when decreasing the operation frequency from higher to lower values. Each individual sensor receives such responses.

Thus, for evaluation of the eccentricity of the pipes, the sensors perform measurements at a range of frequencies with the higher frequencies being sensitive only to the inner-most pipes while lower frequencies being sensitive to all the pipes. With monitoring the response differences between the sensor pairs versus frequency (while decreasing the frequency), and from the frequencies at which the difference exceeds a threshold, the eccentricity of the pipes can be detected and evaluated. This can be performed by comparing the difference in responses with the differences stored in a library or obtained from a forward model.

The responses measured in the time-domain technique and in the frequency-domain technique can be used to perform imaging. Sampling responses along the axial direction, by scanning the tool along the axial direction, and sampling responses along the azimuthal direction, as taught herein, allows for producing two dimensional (2D) images of the pipes. Taking the capability of eccentricity evaluation into account and using that evaluation in correction of the algorithms related to the pipe thickness estimation, quasi-three dimensional (3D) imaging can be implemented for imaging of multiple pipes. These quasi-3D images can lead to better evaluation of the pipes for finding flaws such as defects and metal loss regions.

To have a better estimation of the extent and dimension of flaws, an inversion algorithm can be employed. In this inversion algorithm, the measured responses can be compared with the responses in a library or forward model to estimate the type and extent of the defect. The responses in the library are provided by measurement of some pre-known defects or simulation of some defects. The estimation of the orientation and extent of the eccentricity provides a means to correct for this effect using proper approaches.

Figure 14:
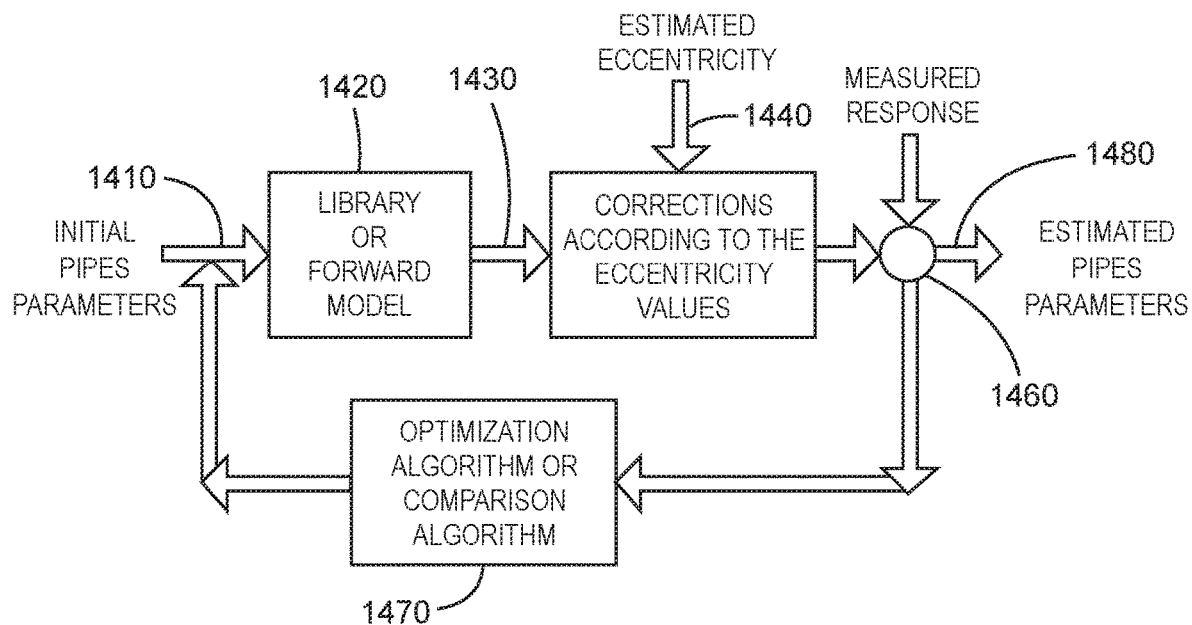
FIG. 14 is a flow diagram of an inversion algorithm for eccentric pipes with correction due to the eccentricity applied to the forward model or the library, in accordance with various embodiments.

FIG. 14 is a flow diagram of an inversion algorithm for eccentric pipes with correction due to the eccentricity applied to the forward model or the library. At 1410, initial parameters of the pipes of a multi-pipe structure are input to a library or forward model. At 1420, the library or forward model operates on the input to the library or forward model. At 1430, results from operation of the library or forward model are input to a corrections process with respect to eccentricity values. At 1440, estimated eccentricities for the pipes of the multi-pipe structure are input to the corrections process. At 1450, the corrections process operates on the results from operation of the library or forward model with the inputted estimated eccentricity for the pipes of the multi-pipe structure.

At 1460, a comparison is made between the output of the corrections process and measured responses. If the comparison does not meet a convergence condition, the comparison, the output of the corrections process, and/or the measured responses can be input to an optimization algorithm. At 1470, the optimization algorithm operates on the input to the optimization algorithm. The result of the optimization is input to the library or forward model for further processing, where the results of such processing are input to the corrections process, which operates on this input with the estimated eccentricity and outputs results of this updated corrections process to the comparison at 1460. If the comparison does not meet the convergence condition, the comparison, the output of the corrections process, and/or the measured responses can again be input to the optimization algorithm, and the procedure can continue. If the comparison meets the convergence condition, the results of the comparison can include generation of estimated parameters of the pipes at 1480. The results can be evaluated and imaged on a display structure.

Figure 15:
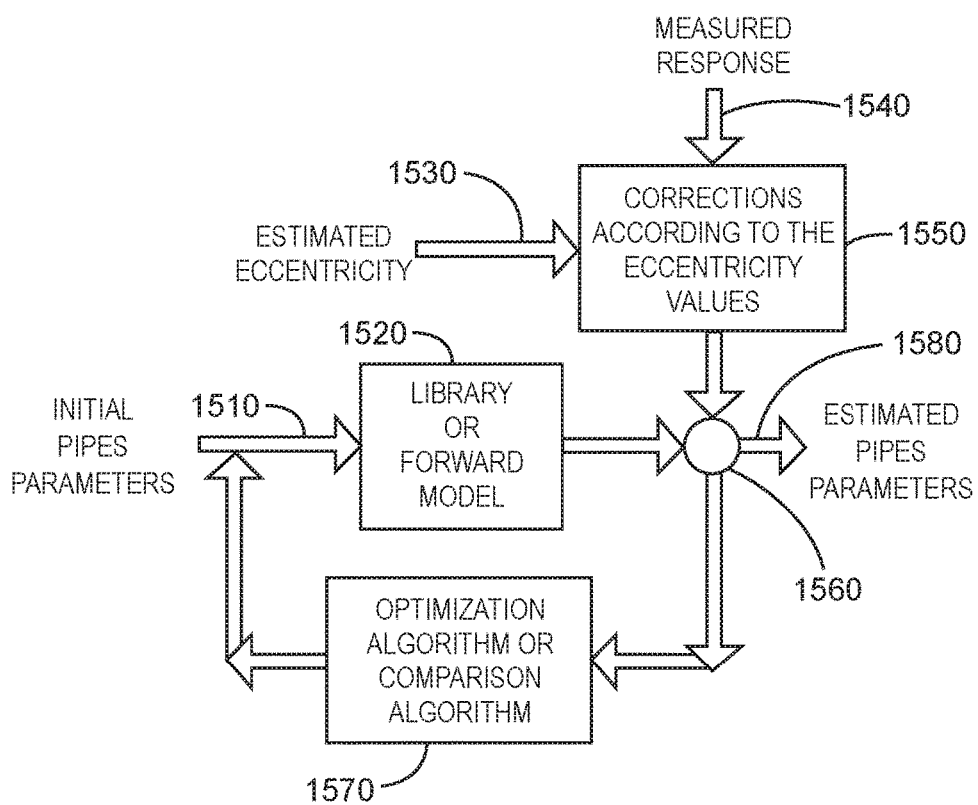
FIG. 15 is a flow diagram of an inversion algorithm for eccentric pipes with correction due to the eccentricity applied to measured responses, in accordance with various embodiments.

FIG. 15 is a flow diagram of an inversion algorithm for eccentric pipes with correction due to the eccentricity applied to measured responses. At 1510, initial parameters of the pipes of a multi-pipe structure are input to a library or forward model. At 1520, the library or forward model operates on the input to the library or forward model. At 1530, estimated eccentricities for the pipes of the multi-pipe structure are input to a corrections process taking into account eccentricity values. At 1540, measured responses are input to the corrections process. At 1550, the corrections process operates on the measured responses with the inputted estimated eccentricity for the pipes of the multi-pipe structure. At 1560, a comparison is made between the output of the corrections process and an output of the library or forward model. If the comparison does not meet a convergence condition, the comparison, the output of the corrections process, and/or the output of the library or forward model can be input to an optimization algorithm. At 1570, the optimization algorithm operates on the input to the optimization algorithm. The result of the optimization is input to the library or forward model for further processing, where the results of such processing are input to the comparison process, which operates on this input with the output results of the corrections process at 1560. If the comparison does not meet the convergence condition, the comparison, the output of the corrections process, and/or the output of the library or forward model can again be input to the optimization algorithm, and the procedure can continue. If the comparison meets the convergence condition, the results of the comparison can include generation of estimated parameters of the pipes at 1580. The results can be evaluated and imaged on a display structure.

Figure 16:
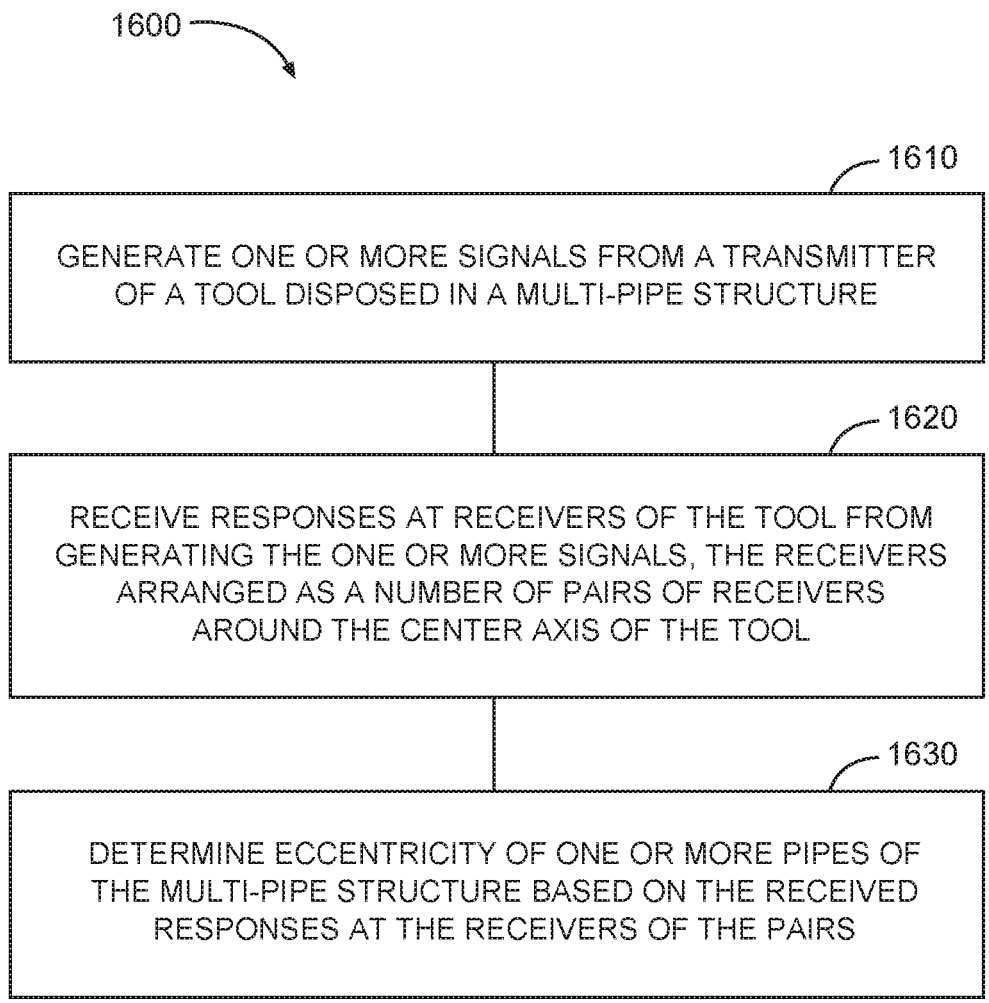
FIG. 16 is a flow diagram of features of an example method of monitoring and evaluating a multi-pipe structure, in accordance with various embodiments.

FIG. 16 is a flow diagram of features of an embodiment of an example method 1600 of monitoring and evaluating a multi-pipe structure. At 1610, one or more signals from a transmitter of a tool disposed in a multi-pipe structure are generated. The multi-pipe structure can have a number of pipes. The tool can be disposed in the multi-pipe structure such that the tool is within the pipes, where the tool can have a center axis as a symmetry axis of the tool.

At 1620, responses are received at receivers of the tool from generating the one or more signals, where the receivers are arranged as a number of pairs of receivers around the center axis of the tool. Each receiver of a pair can be disposed opposite the other receiver of the pair with respect to the center axis such that each pair is symmetrical with respect to the center axis of the tool. The number of pairs and arrangement of pairs can be distributed azimuthally around the tool such that each pair has an azimuthal angle. At 1630, eccentricity of one or more pipes of the multi-pipe structure is determined based on the received responses at the receivers of the pairs.

Method 1600 or methods similar to method 1600 can include determining a time or frequency at which the responses from the receivers of a pair start to differ, for each pair of receivers; and determining direction and extent of eccentricity of one or more pipes of the multi-pipe structure based on the respective azimuthal angle and the respective time or frequency of one or more receiver pairs of the number of pairs. Determining the time or frequency at which the responses from the receivers of the pair start to differ can include recording the responses from the receivers, the responses being decay responses; comparing the difference of the decay responses to a threshold; and selecting a time or frequency at which the difference is greater than or equal to the threshold as the time or frequency at which the decay responses from the receivers of the pair start to differ. Such method can include determining orientation and extent of eccentricity of one or more pipes of the multi-pipe structure using differences in the responses at the respective azimuthal angle and the respective time or frequency of one or more receiver pairs of the number of pairs. Using differences in the responses of the receivers can include comparing each difference with differences stored in a library or obtained from a forward model.

Method 1600 or methods similar to method 1600 can include determining times or frequencies at which the responses are most affected by collars of a pipe, for each pipe of the multi-pipe structure; using the responses at these times or frequencies to determine positions of the collars on each pipe; comparing differences in magnitude over time or frequency of the responses received by the azimuthally distributed receiver pairs due to the collars for each pipe; and determining orientation, amount, or orientation and amount of eccentricity for each pipe using the differences.

Method 1600 or methods similar to method 1600 can include sampling responses at the azimuthal direction of the pairs at locations along the center axis of the tool; and producing a two-dimensional image of the multi-pipe structure from the sampling.

Method 1600 or methods similar to method 1600 or methods derived from such methods can include using the determined eccentricity to generate corrections in an inversion procedure, estimating one or more flaws in one or more pipes of the multi-pipe structure. Using the determined eccentricity to generate corrections can include modifying a forward model or a library with corrections according to the determined eccentricity or modifying a measured response with corrections according to the determined eccentricity.

Method 1600 or methods similar to method 1600 or methods derived from such methods can include other appropriate techniques and procedures as taught herein.

In various embodiments, a non-transitory machine-readable storage device can comprise instructions stored thereon, which, when performed by a machine, cause the machine to perform operations, the operations comprising one or more features similar to or identical to features of methods and techniques described with respect to method 1600, variations thereof, and/or features of other methods taught herein such as associated with FIGS. 14 and 15. The physical structures of such instructions may be operated on by one or more processors. Executing these physical structures can cause the machine to perform operations comprising: generating one or more signals from a transmitter of a tool disposed in a multi-pipe structure having a number of pipes such that the tool is within the pipes, the tool having a center axis as a symmetry axis of the tool; receiving responses at receivers of the tool from generating the one or more signals, the receivers arranged as a number of pairs of receivers around the center axis of the tool, each receiver of a pair disposed opposite the other receiver of the pair with respect to the center axis such that each pair is symmetrical with respect to the center axis of the tool, the number of pairs and arrangement of pairs distributed azimuthally around the tool such that each pair has an azimuthal angle; and determining eccentricity of one or more pipes of the multi-pipe structure based on the received responses at the receivers of the pairs. The instructions can include instructions to operate a tool or tools having sensors disposed in a multi-pipe structure downhole in a borehole to provide data to process in accordance with the teachings herein. The multi-pipe structure may be realized as a multi-casing structure disposed in a borehole at a well site.

Such machine-readable storage devices can include instructions to include determining a time or frequency at which the responses from the receivers of a pair start to differ, for each pair of receivers; and determining direction and extent of eccentricity of one or more pipes of the multi-pipe structure based on the respective azimuthal angle and the respective time or frequency of one or more receiver pairs of the number of pairs. Determining the time or frequency at which the responses from the receivers of the pair start to differ can include recording the responses from the receivers, the responses being decay responses; comparing the difference of the decay responses to a threshold; and selecting a time or frequency at which the difference is greater than or equal to the threshold as the time or frequency at which the decay responses from the receivers of the pair start to differ. Such instructions can include determining orientation and extent of eccentricity of one or more pipes of the multi-pipe structure using differences in the responses at the respective azimuthal angle and the respective time or frequency of one or more receiver pairs of the number of pairs. Using differences in the responses of the receivers can include comparing each difference with differences stored in a library or obtained from a forward model.

Such machine-readable storage devices can include instructions to include determining times or frequencies at which the responses are most affected by collars of a pipe, for each pipe of the multi-pipe structure; using the responses at these times or frequencies to determine positions of the collars on each pipe; comparing differences in magnitude over time or frequency of the responses received by the azimuthally distributed receiver pairs due to the collars for each pipe; and determining orientation, amount, or orientation and amount of eccentricity for each pipe using the differences.

Such machine-readable storage devices can include instructions to include sampling responses at the azimuthal direction of the pairs at locations along the center axis of the tool; and producing a two-dimensional image of the multi-pipe structure from the sampling. Such machine-readable storage devices can include instructions to include using the determined eccentricity to generate corrections in an inversion procedure, estimating one or more flaws in one or more pipes of the multi-pipe structure. Using the determined eccentricity to generate corrections can include modifying a forward model or a library with corrections according to the determined eccentricity or modifying a measured response with corrections according to the determined eccentricity.

Further, a machine-readable storage device, herein, is a physical device that stores data represented by physical structure within the device. Such a physical device is a non-transitory device. Examples of machine-readable storage devices can include, but are not limited to, read only memory (ROM), random access memory (RAM), a magnetic disk storage device, an optical storage device, a flash memory, and other electronic, magnetic, and/or optical memory devices. The machine-readable device may be a machine-readable medium such as memory module 1735 of FIG. 17, While memory module 1735 is shown as a single unit, terms such as "memory module," "machine-readable medium," "machine-readable device," and similar terms should be taken to include all forms of storage media, either in the form of a single medium (or device) or multiple media (or devices), in all forms. For example, such structures can be realized as centralized database(s), distributed database(s), associated caches, and servers; one or more storage devices, such as storage drives (including but not limited to electronic, magnetic, and optical drives and storage mechanisms), and one or more instances of memory devices or modules (whether main memory; cache storage, either internal or external to a processor; or buffers). Terms such as "memory module," "machine-readable medium," "machine-readable device," shall be taken to include any tangible non-transitory medium which is capable of storing or encoding a sequence of instructions for execution by the machine and that cause the machine to perform any one of the methodologies taught herein. The term "non-transitory" used in reference to a "machine-readable device," "medium," "storage medium," "device," or "storage device" expressly includes all forms of storage drives (optical, magnetic, electrical, etc.) and all forms of memory devices (e.g., DRAM, Flash (of all storage designs), SRAM, MRAM, phase change, etc., as well as all other structures designed to store data of any type for later retrieval.

Figure 17:
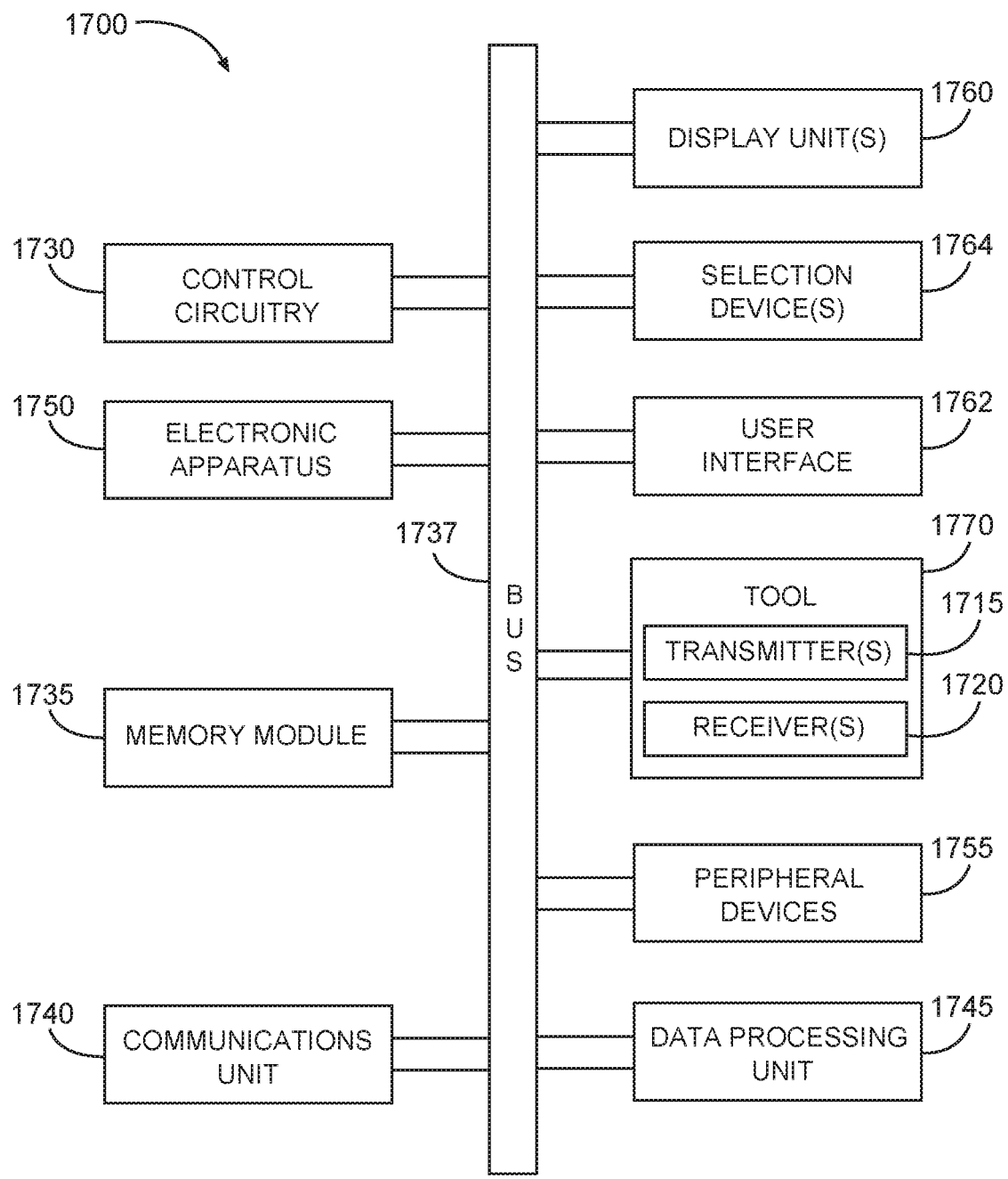
FIG. 17 is a block diagram of features of an example system operable to execute schemes associated with detection and evaluation of eccentricity effect in multiple pipes, in accordance with various embodiments.

FIG. 17 is a block diagram of features of an embodiment of an example system 1700 operable to execute schemes associated with detection and evaluation of eccentricity effect in multiple pipes. The system 1700 can be implemented at a well site to, among other things, determine eccentricity of pipes of a multi-pipe structure disposed in a borehole. The multi-pipe structure may be a production structure of the well site.

The system 1700 can comprise a set of transmitters 1715, a set of receivers 1720, and control circuitry 1730. The transmitters 1715 can be arrangeable in the multi-pipe structure to transmit a plurality of electromagnetic signals in the multi-pipe structure and the set of receivers 1720 can be arrangeable in the multi-pipe structure to receive signals in response to exciting pipes in the multi-pipe structure. The set of receivers 1720 of the tool 1770 are arranged to receive responses in response to exciting pipes in the multi-pipe structure. The set of receivers 1720 can be structured as taught herein, for example similar or identical to receivers associated with FIGS. 5, 6, 10, and 13. The set of receivers 1720 can be arranged as a number of pairs of receivers around the center axis of the tool, where each receiver of a pair is disposed opposite the other receiver of the pair with respect to the center axis such that each pair is symmetrical with respect to the center axis of the tool. The number of pairs and arrangement of pairs can be distributed azimuthally around the tool such that each pair has an azimuthal angle. The set of transmitters 1715 may be realized by one or more transmitters and can include transmitters with variable dimensions or tapped transmitter coils to excite selected ones of the pipes. The control circuitry 1730 can be arranged to control variable current levels to the set of transmitters to excite the selected ones of the pipes. The set of receivers 1720 and/or the set of transmitters 1715 can be arranged in a manner similar to or identical to arrangements as taught herein. System 1700 can be implemented to operate in a manner as taught herein to image the multi-pipe structure such as but not limited to the teachings associated with FIGS. 1-16.

The control circuitry 1730 can be realized as one or more processors. In an embodiment, control circuitry 1730 can be realized as a single processor or a group of processors. Processors of the group of processors may operate independently depending on an assigned function. The control circuitry 1730 can be realized as one more application-specific integrated circuits (ASICs). The control circuitry 1730 can be arranged to determine eccentricity of one or more pipes of the multi-pipe structure based on the received responses at the receivers, where the receivers may be arranged in pairs.

The control circuitry 1730 can be structured to determine a time or frequency at which the responses from the receivers of a pair start to differ, for each pair of receivers; and determine direction and extent of eccentricity of one or more pipes of the multi-pipe structure based on the respective azimuthal angle and the respective time or frequency of one or more receiver pairs of the number of pairs. Determination of the time or frequency at which the responses from the receivers of the pair start to differ can include recordings of the responses from the receivers, the responses being decay responses; comparison of the difference of the decay responses to a threshold; and selection of a time or frequency at which the difference is greater than or equal to the threshold as the time or frequency at which the decay responses from the receivers of the pair start to differ. The control circuitry 1730 can be structured to determine orientation and extent of eccentricity of one or more pipes of the multi-pipe structure using differences in the responses at the respective azimuthal angle and the respective time or frequency of one or more receiver pairs of the number of pairs. Use of differences in the responses of the receivers can include comparison of each difference with differences stored in a library or obtained from a forward model.

The control circuitry 1730 can be structured to determine times or frequencies at which the responses are most affected by collars of a pipe, for each pipe of the multi-pipe structure; use the responses at these times or frequencies to determine positions of the collars on each pipe; compare differences in magnitude over time or frequency of the responses received by the azimuthally distributed receiver pairs due to the collars for each pipe; and determine orientation, amount, or orientation and amount of eccentricity for each pipe using the differences.

In controlling operation of the components of system 1700 to execute schemes associated with detection and evaluation of eccentricity effect in multiple pipes, the control circuitry 1730 can direct access of data to and from a database. The database can include parameters and/or expected parameters for the pipes being investigated such as, but not limited to, diameter (d), magnetic permeability ($\mu$), and electrical conductivity ($\sigma$).

The system 1700 can include a user interface 1762 operable with the control circuitry 1730, a data processing unit 1745 operable with the user interface 1762, where the control circuitry 1730, the user interface 1762, and the data processing unit 1745 are structured to be operated according to any scheme similar to or identical to the schemes associated with detecting and evaluating eccentricity effect in multiple pipes as taught herein. The system 1700 can be structured to conduct operations to sample responses at the azimuthal direction of the pairs at locations along the center axis of the tool; and produce a two-dimensional image of the multi-pipe structure from the sampling. The system 1700 can be structured to operate to conduct any one of the techniques taught herein, wherein the operations can include operations to use the determined eccentricity to generate corrections in an inversion procedure to estimate one or more flaws in one or more pipes of the multi-pipe structure. Use of the determined eccentricity to generate corrections can include modification of a forward model or a library with corrections according to the determined eccentricity or modification of a measured response with corrections according to the determined eccentricity. The system 1700 can be arranged to perform various operations on the data, acquired from the tool 1770 operational in a multi-pipe structure, in a manner similar or identical to any of the processing techniques discussed herein.

The system 1700 can be arranged as a distributed system. Data from operating the tool 1770 at various depths in the multi-pipe structure can be processed by the one or more processors of the control circuitry 1730. Alternatively, imaging may be conducted by the data processing unit 1745 as a dedicated imaging module.

The system 1700 can include a memory module 1735, an electronic apparatus 1750, and a communications unit 1740. The control circuitry 1730, the memory module 1735, and the communications unit 1740 can be arranged to operate as a processing unit to control management of tool 1770 and to perform operations on data signals collected by the tool 1770. The memory module 1735 can include a database having information and other data such that the system 1700 can operate on data from the tool 1770. In an embodiment, the data processing unit 1745 can be distributed among the components of the system 1700 including memory module 1735 and/or the electronic apparatus 1750.

The communications unit 1740 can include downhole communications for communication to the surface at a well site from the tool 1770 in a multi-pipe structure. The communications unit 1740 may use combinations of wired communication technologies and wireless technologies at frequencies that do not interfere with on-going measurements. The communications unit 1740 can allow for a portion or all of the data analysis to be conducted within a multi-pipe structure with results provided to the user interface 1762, for presentation on the one or more display unit(s) 1760 aboveground. The communications unit 1740 can provide for data to be sent aboveground such that substantially all analysis is performed aboveground. The data collected by the tool 1770 can be stored with the tool 1770 that can be brought to the surface to provide the data to the one or more processors of the control circuitry 1730, the user interface 1762, and the data processing unit 1745.

The communications unit 1740 can allow for transmission of commands to tool 1770 in response to signals provided by a user through the user interface 1762.

The system 1700 can also include a bus 1737, where the bus 1737 provides electrical conductivity among the components of the system 1700. The bus 1737 can include an address bus, a data bus, and a control bus, each independently configured. The bus 1737 can be realized using a number of different communication mediums that allows for the distribution of components of the system 1700. Use of the bus 1737 can be regulated by the control circuitry 1730. The bus 1737 can include a communications network to transmit and receive signals including data signals and command and control signals.

In various embodiments, the peripheral devices 1755 can include drivers to provide voltage and/or current input to the set of transmitters 1715, additional storage memory and/or other control devices that may operate in conjunction with the processor(s) of the control circuitry 1730 and/or the memory module 1735. The display unit(s) 1760 can be arranged with a screen display, as a distributed component on the surface, that can be used with instructions stored in the memory module 1735 to implement the user interface 1762, to manage the operation of the tool 1770 and/or components distributed within the system 1700, Such a user interface can be operated in conjunction with the communications unit 1740 and the bus 1737. The display unit(s) 1760 can include a video screen, a printing device, or other structure to visually project data/information and images. The system 1700 can include a number of selection devices 1764 operable with the user interface 1762 to provide user inputs to operate the data processing unit 1745 or its equivalent. The selection device(s) 1764 can include one or more of a touch screen or a computer mouse operable with the user interface 1762 to provide user inputs to operate the data processing unit 1745 or other components of the system 1700.

A method 1 can comprise: generating one or more signals from a transmitter of a tool disposed in a multi-pipe structure having a number of pipes such that the tool is within the pipes, the tool having a center axis as a symmetry axis of the tool; receiving responses at receivers of the tool from generating the one or more signals, the receivers arranged as a number of pairs of receivers around the center axis of the tool, each receiver of a pair disposed opposite the other receiver of the pair with respect to the center axis such that each pair is symmetrical with respect to the center axis of the tool, the number of pairs and arrangement of pairs distributed azimuthally around the tool such that each pair has an azimuthal angle; and determining eccentricity of one or more pipes of the multi-pipe structure based on the received responses at the receivers of the pairs.

A method 2 can include elements of method 1 and can include determining a time or frequency at which the responses from the receivers of a pair start to differ, for each pair of receivers; and determining direction and extent of eccentricity of one or more pipes of the multi-pipe structure based on the respective azimuthal angle and the respective time or frequency of one or more receiver pairs of the number of pairs.

A method 3 can include elements of any of methods 1 and 2 and can include determining the time or frequency at which the responses from the receivers of the pair start to differ to include: recording the responses from the receivers, the responses being decay responses; comparing the difference of the decay responses to a threshold; and selecting a time or frequency at which the difference is greater than or equal to the threshold as the time or frequency at which the decay responses from the receivers of the pair start to differ.

A method 4 can include elements of method 2 and elements of method 3 and can include determining orientation and extent of eccentricity of one or more pipes of the multi-pipe structure using differences in the responses at the respective azimuthal angle and the respective time or frequency of one or more receiver pairs of the number of pairs.

A method 5 can include elements of method 4 and elements of any of methods 1-3 and can include using differences in the responses of the receivers to include comparing each difference with differences stored in a library or obtained from a forward model.

A method 6 can include elements of any of methods 1-5 and can include determining times or frequencies at which the responses are most affected by collars of a pipe, for each pipe of the multi-pipe structure; using the responses at these times or frequencies to determine positions of the collars on each pipe; comparing differences in magnitude over time or frequency of the responses received by the azimuthally distributed receiver pairs due to the collars for each pipe; and determining orientation, amount, or orientation and amount of eccentricity for each pipe using the differences.

A method 7 can include elements of any of methods 1-6 and can include sampling responses at the azimuthal direction of the pairs at locations along the center axis of the tool; and producing a two-dimensional image of the multi-pipe structure from the sampling.

A method 8 can include elements of any of methods 1-7 and can include using the determined eccentricity to generate corrections in an inversion procedure, estimating one or more flaws in one or more pipes of the multi-pipe structure.

A method 9 can include elements of any of methods 1-8 and can include using the determined eccentricity to generate corrections to include modifying a forward model or a library with corrections according to the determined eccentricity or modifying a measured response with corrections according to the determined eccentricity.

A machine-readable storage device 1 having instructions stored thereon, which, when executed by one or more processors of a machine, cause the machine to perform operations, the operations comprising: generating one or more signals from a transmitter of a tool disposed in a multi-pipe structure having a number of pipes such that the tool is within the pipes, the tool having a center axis as a symmetry axis of the tool; receiving responses at receivers of the tool from generating the one or more signals, the receivers arranged as a number of pairs of receivers around the center axis of the tool, each receiver of a pair disposed opposite the other receiver of the pair with respect to the center axis such that each pair is symmetrical with respect to the center axis of the tool, the number of pairs and arrangement of pairs distributed azimuthally around the tool such that each pair has an azimuthal angle; and determining eccentricity of one or more pipes of the multi-pipe structure based on the received responses at the receivers of the pairs.

A machine-readable storage device 2 can include elements of machine-readable storage device 1 and can include the operations to include: determining a time or frequency at which the responses from the receivers of a pair start to differ, for each pair of receivers; and determining direction and extent of eccentricity of one or more pipes of the multi-pipe structure based on the respective azimuthal angle and the respective time or frequency of one or more receiver pairs of the number of pairs.

A machine-readable storage device 3 can include elements of machine-readable storage device 2 and elements of machine-readable storage device 1 and can include determining the time or frequency at which the responses from the receivers of the pair start to differ to include: recording the responses from the receivers, the responses being decay responses; comparing the difference of the decay responses to a threshold; and selecting a time or frequency at which the difference is greater than or equal to the threshold as the time or frequency at which the decay responses from the receivers of the pair start to differ.

A machine-readable storage device 4 can include elements of machine-readable storage device 2 and elements of machine-readable storage devices 1 and 3 and can include operations to include determining orientation and extent of eccentricity of one or more pipes of the multi-pipe structure using differences in the responses at the respective azimuthal angle and the respective time or frequency of one or more receiver pairs of the number of pairs.

A machine-readable storage device 5 can include elements of machine-readable storage device 4 and elements of any of machine-readable storage devices 1-3 and can include using differences in the responses of the receivers to include comparing each difference with differences stored in a library or obtained from a forward model.

A machine-readable storage device 6 can include elements of any of machine-readable storage devices 1-5 and can include operations to comprise: determining times or frequencies at which the responses are most affected by collars of a pipe, for each pipe of the multi-pipe structure; using the responses at these times or frequencies to determine positions of the collars on each pipe; comparing differences in magnitude over time or frequency of the responses received by the azimuthally distributed receiver pairs due to the collars for each pipe; and determining orientation, amount, or orientation and amount of eccentricity for each pipe using the differences.

A machine-readable storage device 7 can include elements of any of machine-readable storage devices 1-6 and can include operations to include sampling responses at the azimuthal direction of the pairs at locations along the center axis of the tool; and producing a two-dimensional image of the multi-pipe structure from the sampling.

A machine-readable storage device 8 can include elements of any of machine-readable storage devices 1-7 and can include operations to include using the determined eccentricity to generate corrections in an inversion procedure, estimating one or more flaws in one or more pipes of the multi-pipe structure.

A machine-readable storage device 9 can include elements of any of machine-readable storage devices 1-8 and can include using the determined eccentricity to generate corrections to include modifying a forward model or a library with corrections according to the determined eccentricity or modifying a measured response with corrections according to the determined eccentricity.

A system 1 can comprise: a tool having a set of transmitters to transmit one or more electromagnetic signals in a multi-pipe structure, the multi-pipe structure having a number of pipes such that the tool is arrangeable within the pipes, the tool having a center axis as a symmetry axis of the tool; a set of receivers of the tool to receive responses in response to exciting pipes in the multi-pipe structure, the set of receivers arranged as a number of pairs of receivers around the center axis of the tool, each receiver of a pair disposed opposite the other receiver of the pair with respect to the center axis such that each pair is symmetrical with respect to the center axis of the tool, the number of pairs and arrangement of pairs distributed azimuthally around the tool such that each pair has an azimuthal angle; and control circuitry arranged to determine eccentricity of one or more pipes of the multi-pipe structure based on the received responses at the receivers of the pairs.

A system 2 can include elements of system 1 and can include the control circuitry structured to: determine a time or frequency at which the responses from the receivers of a pair start to differ, for each pair of receivers; and determine direction and extent of eccentricity of one or more pipes of the multi-pipe structure based on the respective azimuthal angle and the respective time or frequency of one or more receiver pairs of the number of pairs.

A system 3 can include elements of system 2 and elements of system 1 and can include determination of the time or frequency at which the responses from the receivers of the pair start to differ to include: recordings of the responses from the receivers, the responses being decay responses; comparison of the difference of the decay responses to a threshold; and selection of a time or frequency at which the difference is greater than or equal to the threshold as the time or frequency at which the decay responses from the receivers of the pair start to differ.

A system 4 can include elements of any of systems 1-3 elements of system 1 and can include the control circuitry structured to determine orientation and extent of eccentricity of one or more pipes of the multi-pipe structure using differences in the responses at the respective azimuthal angle and the respective time or frequency of one or more receiver pairs of the number of pairs.

A system 5 can include elements of system 4 and elements of any of systems 1-3 and can include use of differences in the responses of the receivers to include comparison of each difference with differences stored in a library or obtained from a forward model.

A system 6 can include elements of any of systems 1-5 and can include the control circuitry is structured to: determine times or frequencies at which the responses are most affected by collars of a pipe, for each pipe of the multi-pipe structure; use the responses at these times or frequencies to determine positions of the collars on each pipe; compare differences in magnitude over time or frequency of the responses received by the azimuthally distributed receiver pairs due to the collars for each pipe; and determine orientation, amount, or orientation and amount of eccentricity for each pipe using the differences.

A system 7 can include elements of any of systems 1-6 and can include the system is structured to conduct operations to: sample responses at the azimuthal direction of the pairs at locations along the center axis of the tool; and produce a two-dimensional image of the multi-pipe structure from the sampling.

A system 8 can include elements of any of systems 1-6 and can include the system structured to conduct operations to use the determined eccentricity to generate corrections in an inversion procedure to estimate one or more flaws in one or more pipes of the multi-pipe structure.

A system 9 can include elements of claim 8 and elements of any of systems 1-7 and can include use of the determined eccentricity to generate corrections to include modification of a forward model or a library with corrections according to the determined eccentricity or modification of a measured response with corrections according to the determined eccentricity.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:

1. A method comprising:
   generating one or more signals from a transmitter of a tool disposed in a multi-pipe structure having a number of pipes such that the tool is within the pipes, the tool having a center axis as a symmetry axis of the tool;
   receiving responses at receivers of the tool from generating the one or more signals, the receivers arranged as a number of pairs of receivers around the center axis of the tool, each receiver of a pair disposed opposite the other receiver of the pair with respect to the center axis such that each pair is symmetrical with respect to the center axis of the tool, the number of pairs and arrangement of pairs distributed azimuthally around the tool such that each pair has an azimuthal angle; and
   determining eccentricity of one or more pipes of the multi-pipe structure based on the received responses at the receivers of the pairs.

2. The method of claim 1, wherein the method includes:
   determining a time or frequency at which the responses from the receivers of a pair start to differ, for each pair of receivers, wherein determining the time or frequency at which the responses from the receivers of the pair start to differ includes:
     recording the responses from the receivers, the responses being decay responses;
     comparing the difference of the decay responses to a threshold; and
     selecting a time or frequency at which the difference is greater than or equal to the threshold as the time or frequency at which the decay responses from the receivers of the pair start to differ; and
   determining direction and extent of eccentricity of one or more pipes of the multi-pipe structure based on the respective azimuthal angle and the respective time or frequency of one or more receiver pairs of the number of pairs.

3. The method of claim 2, wherein the method includes determining orientation and extent of eccentricity of one or more pipes of the multi-pipe structure using differences in the responses at the respective azimuthal angle and the respective time or frequency of one or more receiver pairs of the number of pairs, wherein using differences in the responses of the receivers includes comparing each difference with differences stored in a library or obtained from a forward model.

4. A method of claim 1, wherein the method comprising:
   determining times or frequencies at which the responses are most affected by collars of a pipe, for each pipe of the multi-pipe structure;
   using the responses at these times or frequencies to determine positions of the collars on each pipe;
   comparing differences in magnitude over time or frequency of the responses received by the azimuthally distributed receiver pairs due to the collars for each pipe; and
   determining orientation, amount, or orientation and amount of eccentricity for each pipe using the differences.

5. The method of claim 1, wherein the method includes:
   sampling responses at the azimuthal direction of the pairs at locations along the center axis of the tool; and
   producing a two-dimensional image of the multi-pipe structure from the sampling.

6. The method of claim 1, wherein the method includes using the determined eccentricity to generate corrections in an inversion procedure, estimating one or more flaws in one or more pipes of the multi-pipe structure, wherein using the determined eccentricity to generate corrections includes modifying a forward model or a library with corrections according to the determined eccentricity or modifying a measured response with corrections according to the determined eccentricity.

7. A machine-readable storage device having instructions stored thereon, which, when executed by one or more processors of a machine, cause the machine to perform operations, the operations comprising:
   generating one or more signals from a transmitter of a tool disposed in a multi-pipe structure having a number of pipes such that the tool is within the pipes, the tool having a center axis as a symmetry axis of the tool;
   receiving responses at receivers of the tool from generating the one or more signals, the receivers arranged as a number of pairs of receivers around the center axis of the tool, each receiver of a pair disposed opposite the other receiver of the pair with respect to the center axis such that each pair is symmetrical with respect to the center axis of the tool, the number of pairs and arrangement of pairs distributed azimuthally around the tool such that each pair has an azimuthal angle; and
   determining eccentricity of one or more pipes of the multi-pipe structure based on the received responses at the receivers of the pairs.

8. The machine-readable storage device of claim 7, wherein the operations include:
   determining a time or frequency at which the responses from the receivers of a pair start to differ, for each pair of receivers, wherein determining the time or frequency at which the responses from the receivers of the pair start to differ includes:
     recording the responses from the receivers, the responses being decay responses;
     comparing the difference of the decay responses to a threshold; and
     selecting a time or frequency at which the difference is greater than or equal to the threshold as the time or frequency at which the decay responses from the receivers of the pair start to differ; and
   determining direction and extent of eccentricity of one or more pipes of the multi-pipe structure based on the respective azimuthal angle and the respective time or frequency of one or more receiver pairs of the number of pairs.

9. The machine-readable storage device of claim 8, wherein the operations include determining orientation and extent of eccentricity of one or more pipes of the multi-pipe structure using differences in the responses at the respective azimuthal angle and the respective time or frequency of one or more receiver pairs of the number of pairs, wherein using differences in the responses of the receivers includes comparing each difference with differences stored in a library or obtained from a forward model.

10. The machine-readable storage device of claim 7, wherein the operations comprise:

determining times or frequencies at which the responses are most affected by collars of a pipe, for each pipe of the multi-pipe structure;
using the responses at these times or frequencies to determine positions of the collars on each pipe;
comparing differences in magnitude over time or frequency of the responses received by the azimuthally distributed receiver pairs due to the collars for each pipe; and
determining orientation, amount, or orientation and amount of eccentricity for each pipe using the differences.

11. The machine-readable storage device of claim 7, wherein the operations include:
sampling responses at the azimuthal direction of the pairs at locations along the center axis of the tool; and
producing a two-dimensional image of the multi-pipe structure from the sampling.

12. The machine-readable storage device of claim 7, wherein the operations include using the determined eccentricity to generate corrections in an inversion procedure, estimating one or more flaws in one or more pipes of the multi-pipe structure, wherein using the determined eccentricity to generate corrections includes modifying a forward model or a library with corrections according to the determined eccentricity or modifying a measured response with corrections according to the determined eccentricity.

13. A system comprising:
a tool having a set of transmitters to transmit one or more electromagnetic signals in a multi-pipe structure, the multi-pipe structure having a number of pipes such that the tool is arrangeable within the pipes, the tool having a center axis as a symmetry axis of the tool;
a set of receivers of the tool to receive responses in response to exciting pipes in the multi-pipe structure, the set of receivers arranged as a number of pairs of receivers around the center axis of the tool, each receiver of a pair disposed opposite the other receiver of the pair with respect to the center axis such that each pair is symmetrical with respect to the center axis of the tool, the number of pairs and arrangement of pairs distributed azimuthally around the tool such that each pair has an azimuthal angle; and
control circuitry arranged to determine eccentricity of one or more pipes of the multi-pipe structure based on the received responses at the receivers of the pairs.

14. The system of claim 13, wherein the control circuitry is structured to:
determine a time or frequency at which the responses from the receivers of a pair start to differ, for each pair of receivers; and
determine direction and extent of eccentricity of one or more pipes of the multi-pipe structure based on the respective azimuthal angle and the respective time or frequency of one or more receiver pairs of the number of pairs.

15. The system of claim 14, wherein determination of the time or frequency at which the responses from the receivers of the pair start to differ includes:
recordings of the responses from the receivers, the responses being decay responses;
comparison of the difference of the decay responses to a threshold; and
selection of a time or frequency at which the difference is greater than or equal to the threshold as the time or frequency at which the decay responses from the receivers of the pair start to differ.

16. The system of claim 14, wherein the control circuitry is structured to determine orientation and extent of eccentricity of one or more pipes of the multi-pipe structure using differences in the responses at the respective azimuthal angle and the respective time or frequency of one or more receiver pairs of the number of pairs, wherein use of differences in the responses of the receivers includes comparison of each difference with differences stored in a library or obtained from a forward model.

17. The system of claim 13, wherein the control circuitry is structured to:
determine times or frequencies at which the responses are most affected by collars of a pipe, for each pipe of the multi-pipe structure;
use the responses at these times or frequencies to determine positions of the collars on each pipe;
compare differences in magnitude over time or frequency of the responses received by the azimuthally distributed receiver pairs due to the collars for each pipe; and
determine orientation, amount, or orientation and amount of eccentricity for each pipe using the differences.

18. The system of claim 13, wherein the system is structured to conduct operations to:
sample responses at the azimuthal direction of the pairs at locations along the center axis of the tool; and
produce a two-dimensional image of the multi-pipe structure from the sampling.

19. The system of claim 18, wherein the system is structured to conduct operations to use the determined eccentricity to generate corrections in an inversion procedure to estimate one or more flaws in one or more pipes of the multi-pipe structure.

20. The system of claim 19, wherein use of the determined eccentricity to generate corrections includes modification of a forward model or a library with corrections according to the determined eccentricity or modification of a measured response with corrections according to the determined eccentricity.

* * * * *